United States Patent
Tsotsis et al.

(10) Patent No.: US 12,319,012 B2
(45) Date of Patent: Jun. 3, 2025

(54) METHODS FOR MANUFACTURING FIBER-MODIFIED INTERLAYERS FOR COMPOSITE STRUCTURES

(71) Applicant: The Boeing Company, Chicago, IL (US)

(72) Inventors: Thomas K. Tsotsis, Santa Ana, CA (US); Joseph E. Sprengard, Cincinnati, OH (US)

(73) Assignee: The Boeing Company, Arlington, VA (US)

( * ) Notice: Subject to any disclaimer, the term of this patent is extended or adjusted under 35 U.S.C. 154(b) by 501 days.

(21) Appl. No.: 17/061,814

(22) Filed: Oct. 2, 2020

(65) Prior Publication Data

US 2021/0023813 A1 Jan. 28, 2021

Related U.S. Application Data

(62) Division of application No. 15/373,769, filed on Dec. 9, 2016, now abandoned.

(51) Int. Cl.
*B29C 70/08* (2006.01)
*B29C 70/30* (2006.01)
(Continued)

(52) U.S. Cl.
CPC ............ *B29C 70/081* (2013.01); *B29C 70/30* (2013.01); *B29C 70/50* (2013.01); *B32B 5/022* (2013.01); *B32B 5/08* (2013.01); *B32B 5/12* (2013.01); *B32B 5/26* (2013.01); *B32B 37/04* (2013.01); *B32B 37/203* (2013.01); *B32B 38/08* (2013.01); *D04H 1/4242* (2013.01); *D04H 1/4374* (2013.01); *D04H 3/14* (2013.01);
(Continued)

(58) Field of Classification Search
CPC ....... B29C 70/081; B32B 37/04; B32B 38/08; B32B 38/1808; B32B 2038/0076; B32B 2038/008; B32B 2305/20; B32B 2305/72; B32B 2307/202; D06B 3/10; D04H 1/4242; B01D 67/00413; B01D 71/0212
See application file for complete search history.

(56) References Cited

U.S. PATENT DOCUMENTS 5,286,553 A 2/1994 Haraguchi et al.
6,585,842 B1 7/2003 Bompard et al.
(Continued)

FOREIGN PATENT DOCUMENTS

CN 102516569 6/2012
CN 103937426 7/2014
(Continued)

OTHER PUBLICATIONS

Korean Intellectual Property Office, Office Action, with English translation, App. No. 10-2017-0168203 (May 17, 2022).
(Continued)

*Primary Examiner* — John L Goff, II
(74) *Attorney, Agent, or Firm* — Walters & Wasylyna LLC

(57) ABSTRACT

A composite manufacturing method includes the step of drawing a nonwoven fabric formed of continuous fibers through a slurry of discontinuous fibers suspended in a dispersive liquid to yield a fiber-modified interlayer comprising a network of said discontinuous fibers attached to said nonwoven fabric.

20 Claims, 14 Drawing Sheets

(51) Int. Cl.
  *B29C 70/50* (2006.01)
  *B32B 5/02* (2006.01)
  *B32B 5/08* (2006.01)
  *B32B 5/12* (2006.01)
  *B32B 5/26* (2006.01)
  *B32B 37/04* (2006.01)
  *B32B 37/20* (2006.01)
  *B32B 38/08* (2006.01)
  *D04H 1/4242* (2012.01)
  *D04H 1/4374* (2012.01)
  *D04H 3/14* (2012.01)
  *D04H 5/02* (2012.01)
  *D04H 5/08* (2012.01)
  *D06B 3/10* (2006.01)
  *B29C 70/34* (2006.01)
  *B29K 301/12* (2006.01)
  *B29K 307/04* (2006.01)
  *B29L 31/30* (2006.01)
  *B32B 38/00* (2006.01)
  *B32B 38/18* (2006.01)

(52) U.S. Cl.
  CPC .............. *D04H 5/02* (2013.01); *D04H 5/08* (2013.01); *D06B 3/10* (2013.01); *B29C 70/34* (2013.01); *B29K 2301/12* (2013.01); *B29K 2307/04* (2013.01); *B29K 2995/0005* (2013.01); *B29K 2995/0089* (2013.01); *B29K 2995/0091* (2013.01); *B29L 2031/30* (2013.01); *B29L 2031/3076* (2013.01); *B32B 2038/0076* (2013.01); *B32B 2038/008* (2013.01); *B32B 38/1808* (2013.01); *B32B 2260/023* (2013.01); *B32B 2262/02* (2013.01); *B32B 2262/106* (2013.01); *B32B 2262/14* (2013.01); *B32B 2305/08* (2013.01); *B32B 2305/20* (2013.01); *B32B 2305/72* (2013.01); *B32B 2307/202* (2013.01); *B32B 2307/558* (2013.01); *B32B 2307/56* (2013.01); *B32B 2313/04* (2013.01); *B32B 2398/20* (2013.01); *B32B 2605/00* (2013.01); *B32B 2605/18* (2013.01)

(56) References Cited

U.S. PATENT DOCUMENTS

| | | | |
|---|---|---|---|
| 7,435,693 | B2 | 10/2008 | Tsotsis et al. |
| 8,246,882 | B2 | 8/2012 | Tsotsis |
| 8,361,262 | B2 | 1/2013 | Tsotsis et al. |
| 8,372,231 | B1 | 2/2013 | Tsotsis |
| 8,388,795 | B2 | 3/2013 | Tsotsis |
| 8,607,835 | B2 | 12/2013 | Tsotsis |
| 8,657,990 | B2 | 2/2014 | Tsotsis |
| 8,852,713 | B2 | 10/2014 | Tsotsis |
| 2005/0059309 | A1 | 3/2005 | Tsotsis |
| 2008/0286564 | A1* | 11/2008 | Tsotsis ............ B29C 70/48 156/278 |
| 2013/0316172 | A1 | 11/2013 | Shanov et al. |
| 2015/0167249 | A1 | 6/2015 | Ono et al. |
| 2015/0174872 | A1 | 6/2015 | Bonneau et al. |
| 2016/0009051 | A1 | 1/2016 | Tsotsis |
| 2016/0023427 | A1 | 1/2016 | Guerra et al. |
| 2016/0089853 | A1 | 3/2016 | Meure et al. |
| 2016/0177511 | A1* | 6/2016 | Horne ............ D21F 9/00 162/263 |
| 2017/0158511 | A1* | 6/2017 | Braley ............ B32B 5/24 |
| 2017/0291332 | A1* | 10/2017 | Braley ............ B32B 3/266 |
| 2017/0352948 | A1* | 12/2017 | Urcia ............ H01Q 1/286 |
| 2018/0077828 | A1* | 3/2018 | Braley ............ B32B 5/30 |
| 2018/0370087 | A1* | 12/2018 | Braley ............ B29C 70/025 |
| 2022/0088891 | A1 | 3/2022 | Meure et al. |

FOREIGN PATENT DOCUMENTS

| | | |
|---|---|---|
| CN | 105 200 539 | 12/2015 |
| DE | 102012206404 | 2/2013 |
| EP | 0 938 601 | 9/1999 |
| EP | 2 053 078 | 4/2009 |
| EP | 3 002 355 | 4/2016 |
| JP | H07 173754 | 7/1995 |
| JP | 2004-084092 | 3/2004 |
| JP | 2004-103403 | 4/2004 |
| JP | 2012-046843 | 3/2012 |
| JP | 2013-099940 | 5/2013 |
| JP | 2013-155379 | 8/2013 |
| JP | 2016-505699 | 2/2016 |
| JP | 2016-104920 | 6/2016 |
| JP | 2017-529298 | 10/2017 |
| KR | 10-2004-0018073 | 3/2004 |
| WO | WO 99/22059 | 5/1999 |
| WO | WO 2014/014099 | 1/2014 |
| WO | WO 2014/120347 | 8/2014 |
| WO | WO 2016/019143 | 2/2016 |

OTHER PUBLICATIONS

Translation of Japanese Office Action dated Jul. 5, 2022, App. No. 2017-235628, (Date corrected).
Japan Patent Office, Office Action, with English translation, App. No. 2017-235628 (Nov. 30, 2021).
National Institute of Industrial Property (Brazil), Office Action, with English translation, App. No. BR102017023919-5 (Oct. 16, 2022).
European Patent Office, Extended European Search Report, App. No. 21155190.8 (Apr. 14, 2021).
European Patent Office, "Communication pursuant to Article 94(3) EPC," App. No. 21 155 190.8 (Jun. 30, 2022).
China National Intellectual Property Administration, Office Action, with English translation, App. No. 201711187513.8 (Mar. 1, 2021).
National Institute of Industrial Property (Brazil), Office Action, with English translation, App. No. BR102017023919-5 (Sep. 2, 2021).
Korean Intellectual Property Office, Office Action, App. No. 10-2017-0168203 (Oct. 29, 2022).
Tsotsis, "Interlayer Toughening of Composite Materials," *Polymer Composites* (2009).
Lingang, "Investigations on damage resistance of carbon fiber composite panels toughened using veils," *Chinese Journal of Aeronautics*, 23(3): 807-813 (2013).

* cited by examiner

METHODS FOR MANUFACTURING FIBER-MODIFIED INTERLAYERS FOR COMPOSITE STRUCTURES

PRIORITY

This application is a divisional of U.S. Ser. No. 15/373,769 filed on Dec. 9, 2016, now abandoned.

FIELD

The present disclosure is generally related to composites and, more particularly, to reinforcement materials used to fabricate composite laminates and, still more particularly, to fiber-modified interlayers used to fabricate the reinforcement materials that increase impact resistance and electrical conductivity of a composite structure.

BACKGROUND

Composite materials are frequently used for aerospace, automotive and marine applications because of high strength-to-weight ratios, corrosion resistance, and other favorable properties. Conventional composite materials typically include reinforcing fiber layers (e.g., glass, carbon, or polyamide fiber) in woven and/or non-woven configurations. The fiber layers can be manufactured into composite structures by laminating them together with an uncured matrix material (e.g., an epoxy resin). The laminate can then be cured with the application of heat and/or pressure to form the finished and hardened composite part.

The fiber layers in composite structures provide relatively high strength in the direction of the fibers. However, impact resistance is generally determined by the properties of the cured matrix material. One way to enhance the impact resistance of the composite structure is to add particles of a thermoplastic material to the matrix material. Another way to increase the impact resistance of the composite part is to provide a thermoplastic interlayer between the fiber layers.

However, composite structures that are toughened by thermoplastic particles or interlayers may be subject to charging during a lightning strike, which is a potential cause of edge glow. As used herein, the term "edge glow" has its ordinary meaning as known to those skilled in the art and may include low-level electrical or thermal sparking that can occur at an edge of a carbon-fiber composite material because of a breakdown of resin between fibers or contact between fibers. Additionally, composite structures that are toughened by thermoplastic particles or interlayers may have lower than desirable mechanical-property retention at elevated temperatures.

Accordingly, those skilled in the art continue with research and development efforts in the field of composite structures.

SUMMARY

In one embodiment, the disclosed fiber-modified interlayer includes a nonwoven fabric layer formed of continuous fibers, and discontinuous fibers attached to the nonwoven fabric.

In another embodiment, the disclosed interlayer-toughened reinforcing fabric includes at least one reinforcing layer formed of structural tows, and at least one fiber-modified interlayer attached to the reinforcing layer, wherein the fiber-modified interlayer includes a nonwoven fabric layer formed of continuous fibers, and discontinuous fibers attached to the nonwoven fabric.

In another embodiment, the disclosed composite structure includes at least one layer of an interlayer-toughened reinforcing fabric, wherein the interlayer-toughened reinforcing fabric includes at least one reinforcing layer formed of structural tows and at least one fiber-modified interlayer attached to the reinforcing layer arranged in an alternating configuration, and wherein the fiber-modified interlayer includes a nonwoven fabric layer formed of continuous fibers and discontinuous fibers attached to the nonwoven fabric, and a matrix material infused into the interlayer-toughened reinforcing fabric.

In another embodiment, the disclosed method for manufacturing a fiber-modified interlayer includes the steps of: (1) drawing a nonwoven fabric formed of continuous fibers through a slurry of discontinuous fibers suspended in a dispersive liquid, (2) forming a network of the discontinuous fibers attached to the nonwoven fabric, and (3) forming the fiber-modified interlayer.

In another embodiment, the disclosed method for manufacturing an interlayer-toughened reinforcing fabric includes the steps of: (1) arranging a least one reinforcing layer formed of structural tows and at least one fiber-modified interlayer in an alternating configuration, wherein the fiber-modified interlayer includes a nonwoven fabric layer formed of continuous fibers, and discontinuous fibers attached to the nonwoven fabric, and (2) attaching the reinforcing layer and the nonwoven fabric layer together.

In another embodiment, the disclosed method for manufacturing a composite structure includes the steps of: (1) laying up at least one layer of an interlayer-toughened reinforcing fabric onto a mold, wherein the interlayer-toughened reinforcing fabric includes a least one reinforcing layer formed of structural tows, and at least one fiber-modified interlayer attached to the reinforcing layer arranged in an alternating configuration, and wherein the fiber-modified interlayer includes a nonwoven fabric layer formed of continuous fibers, and discontinuous fibers attached to the nonwoven fabric, (2) infusing the interlayer-toughened reinforcing fabric with a matrix material, (3) curing the matrix material, and (4) forming the composite structure.

In another embodiment, the disclosed method for dissipating electromagnetic energy through a composite structure including a reinforcing material and a matrix material, the method includes the steps of: (1) imparting the electromagnetic energy on a surface of the composite structure, the composite structure including a reinforcing material and a matrix material, (2) dispersing the electromagnetic energy laterally along a continuously conductive path, and (3) transferring the electromagnetic energy to a ground plane coupled to the composite structure.

In another embodiment, the disclosed method for dissipating impact energy through a composite structure includes the steps of: (1) imparting the impact energy on a surface of the composite structure, the composite structure including a reinforcing material and a matrix material, the method, (2) deflecting the impact energy laterally along the composite structure, and (3) suppressing damage growth through a thickness of the composite structure.

Other embodiments of the disclosed apparatus and method will become apparent from the following detailed description, the accompanying drawings and the appended claims.

DETAILED DESCRIPTION

Figure 1:
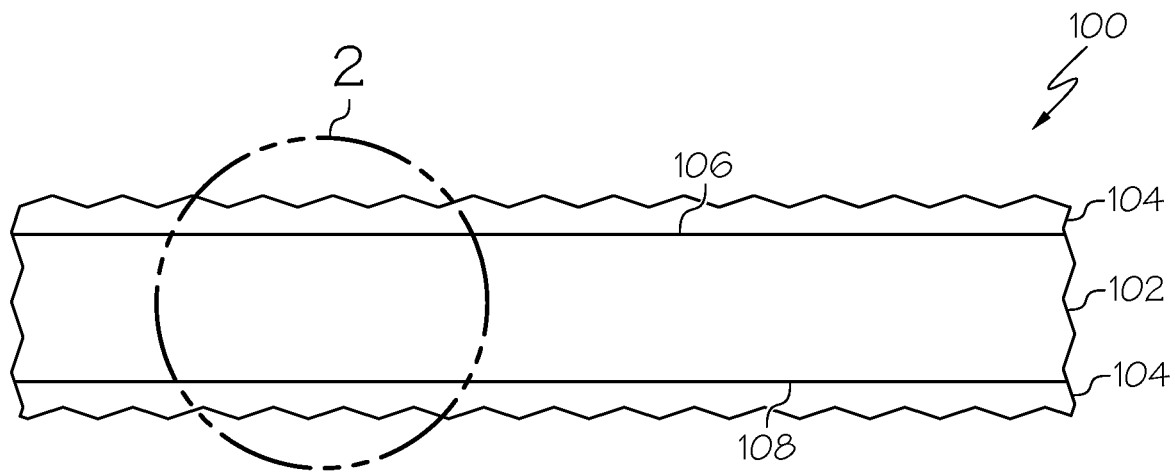
FIG. 1 is a schematic partial side view, in section, of an embodiment of the disclosed fiber-modified interlayer.

The following detailed description refers to the accompanying drawings, which illustrate specific embodiments and/or examples described by the disclosure. Other embodiments and/or examples having different structures and operations do not depart from the scope of the present disclosure. Like reference numerals may refer to the same feature, element or component in the different drawings.

Illustrative, non-exhaustive embodiments, which may be, but are not necessarily, claimed, of the subject matter according the present disclosure are provided below.

FIG. 1 is a schematic partial side view, in section, of an exemplary embodiment of the disclosed fiber-modified interlayer 100. As used herein, the term "interlayer" or "interlaminar layer" has its ordinary meaning as known to those skilled in the art and may include the intended use of a material as a layer placed between other layers in a composite material, such as between adjacent layers of structural tows (e.g., continuous filaments or fibers) of the composite material to impart a toughening effect on a cured composite structure.

The fiber-modified interlayer 100 includes a nonwoven fabric layer 102 (e.g., a layer of nonwoven fabric 202) (FIG. 3) and a fiber layer 104 (e.g., a layer of discontinuous fibers 116) (FIG. 2) coupled to the nonwoven fabric layer 102. In the illustrative embodiment, the nonwoven fabric layer 102 includes a first (e.g., top) surface 106 and an opposed second (e.g., bottom) surface 108. A first fiber layer 104 is coupled to the first surface 106 of the nonwoven fabric layer 102 and a second fiber layer 104 is coupled to the second surface 108 of the nonwoven fabric layer 102.

Figure 2:
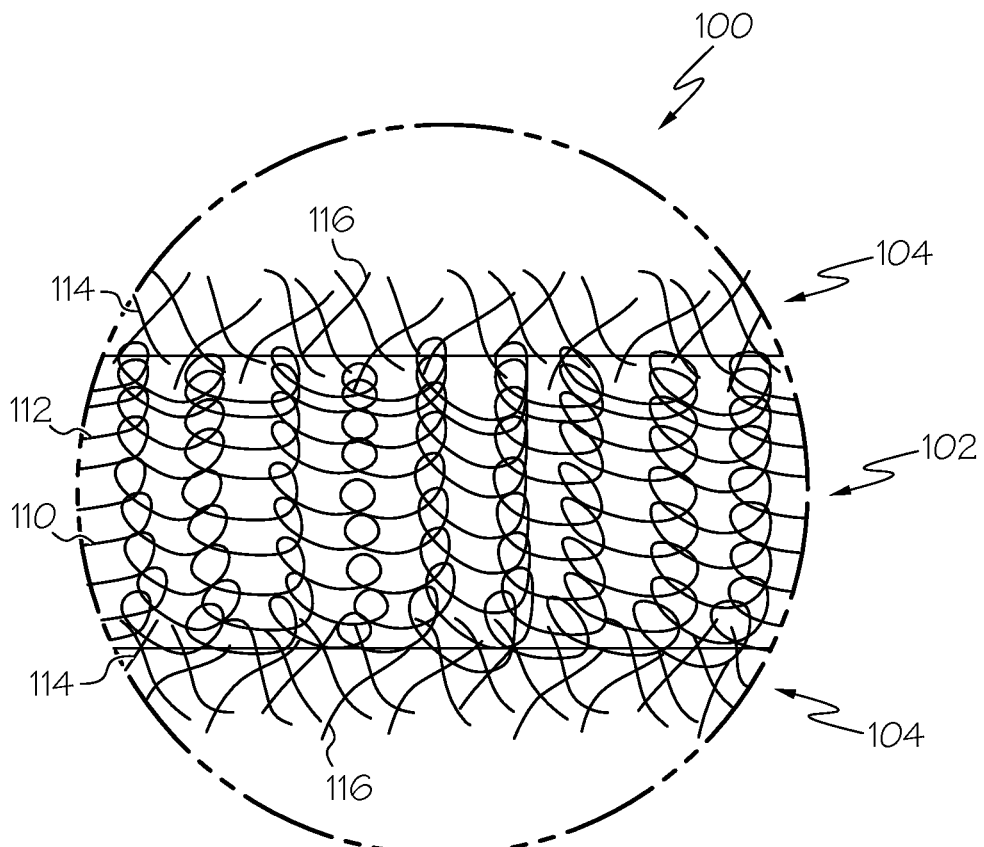
FIG. 2 is a schematic enlarged partial side view, in section, of the fiber-modified interlayer of FIG. 1.

FIG. 2 is a schematic enlarged partial side view, in section, of the fiber-modified interlayer 100 of FIG. 1. In an exemplary embodiment, the nonwoven fabric layer 102 includes, or is made of, a structure 112 of continuous fibers 110. As used herein, the term "fiber" has its ordinary meaning as known to those skilled in the art and may include one or more fibrous materials (e.g., fibers or filaments). As used herein, the term "continuous fiber" has its ordinary meaning as known to those skilled in the art and may include an elongated fiber, or filament, adapted to form the nonwoven fabric layer 102 and that extends across substantially the entire length or width of the associated nonwoven fabric layer 102. The structure 112 may include a web structure of intermingled and entangled continuous fibers 110 that are bonded together, for example, by at least one of mechanically, thermally and/or chemically.

In an example embodiment, the nonwoven fabric layer 102 may be a spunbonded fabric of continuous fibers 110. Spunbonded fabrics are produced from continuous fibers 110 that are continuously spun and bonded thermally.

In another example embodiment, the nonwoven fabric layer 102 may be a spunlaced fabric of continuous fibers 110. Spunlaced fabrics may be prepared from continuous or discontinuous fibers 116 that are entangled and thereby bonded mechanically.

In yet another example embodiment, the nonwoven fabric layer 102 may be a mesh fabric of continuous fibers 110. As an example, a mesh construction of the nonwoven fabric layer 102 may contain between approximately 0.5 and approximately 15 fibers per inch in the warp and weft directions.

In an exemplary embodiment, the nonwoven fabric layer 102 may be implemented, and commonly be referred to, as a nonwoven veil. In other embodiments, the nonwoven fabric layer 102 may be implemented as at least one of a nonwoven mat, a nonwoven sheet, a nonwoven tape or other type of collection of continuous fibers 110 in a nonwoven format.

In an exemplary embodiment, the continuous fibers 110 of the nonwoven fabric layer 102 include, or are made of, a thermoplastic material (e.g., thermoplastic fibers). The melting point of the thermoplastic material of the nonwoven fabric layer 102 is typically near or above the cure temperature of a matrix material (e.g., a thermosetting matrix material), used to form a composite material, to ensure that composite properties, such as elevated-temperature compression strength, are not compromised.

Additionally, the thermoplastic materials also have good resistance to solvents like ketones, water, jet fuel, and brake fluids to ensure that the composite material does not become susceptible to strength degradation when exposed to these solvents.

In other example embodiments, the continuous fibers 110 of the nonwoven fabric layer 102 may be selected from a variety of other suitable materials including, for example, without limitation, polyamide, polyimide, polyamide-imide, polyester, polybutadiene, polyurethane, polypropylene, polyetherimide, polysulfone, polyethersulfone, polyphenylsulfone, polyphenylene sulfide, polyetherketone, polyethertherketone, polyarylamide, polyketone, polyphthalamide, polyphenylenether, polybutylene terephthalate, polyethylene terephthalate, polyester-polyarylate (e.g. Vectran®), polyaramid (e.g. Kevlar®), polybenzoxazole (e.g. Zylon®), viscose (e.g. Rayon®), carbon fiber, and glass fiber.

In yet other embodiments, the continuous fibers 110 may also be selected from among any type of fibrous materials that are compatible with the matrix material used to form the composite material and that do not dissolve during infusion and cure into the matrix material. In other words, the fibrous material of the nonwoven fabric layer 102 is not soluble to any great extent in the underlying matrix material, except as to facilitate better contact and/or adhesion between the fiber-modified interlayer 100 and the matrix material.

In an example embodiment, the continuous fibers 110 of the nonwoven fabric layer 102 are made from two or more materials. As an example, the two or more materials may be prepared by mechanically mixing different types of continuous fibers 110, which are used to create the nonwoven fabric layer 102.

In another example embodiment, two or more materials may be used to form a bi-component fiber, tri-component fiber, or higher component fiber, which are used to create the nonwoven fabric layer 102. In other words, each continuous fiber 110 used for the nonwoven fabric layer 102 may include multiple materials. As an example, a multi-component continuous fiber 110 may be made by coextrusion of two or more fiber materials and produced by a spinneret with multiple outlets.

Each continuous fiber 110 of the nonwoven fabric layer 102 may have any size, for example, according to the particular application for the fiber-modified interlayer 100 and the resulting composite material. As an example, the continuous fibers 110 making up the nonwoven fabric layer 102 may have diameters from approximately 1 micron to approximately 100 microns. As another example, the continuous fibers 110 making up the nonwoven fabric layer 102 may have diameters from approximately 10 microns to approximately 75 microns. As an example, the continuous fibers 110 making up the nonwoven fabric layer 102 may have diameters from approximately 10 microns to approximately 30 microns. As yet another example, the continuous fibers 110 making up the nonwoven fabric layer 102 may have diameters from approximately 1 micron to approximately 15 microns.

The material used for the nonwoven fabric layer 102 may also have a wide range of areal densities. The areal density may be chosen according to the amount required to impart the desired impact resistance, for example, as verified by compression-after-impact testing. As an example, the nonwoven fabric layer 102 may have an areal density of between approximately 1 grams/square meter (g/m$^2$) and approximately 50 g/m$^2$. As another example, the areal density of each nonwoven fabric layer 102 may be between approximately 2 g/m$^2$ and approximately 15 g/m$^2$. As another example, the areal density of each nonwoven fabric layer 102 may be between approximately 5 g/m$^2$ and approximately 15 g/m$^2$. As yet another example, the areal density of each nonwoven fabric layer 102 may be between approximately 3 g/m$^2$ and approximately 4 g/m$^2$. The optimum areal weight for any particular composite member made using the fiber-modified interlayer 100 may be determined as needed, but typically is between approximately 2% and approximately 4% of the overall composite weight.

In an exemplary embodiment, the fiber layer 104 includes, or is made of, a network 114 of discontinuous fibers 116. As used herein, the term "discontinuous fiber" has its ordinary meaning as known to those skilled in the art and may include a short or chopped fiber, or filament, adapted to form the fiber layer 104 and that that does not extend across substantially the entire length or width of the nonwoven fabric layer 102. The network 114 may include a network of intermingled and entangled discontinuous fibers 116 that are bonded together mechanically. In other words, the discontinuous fibers 116 may be mechanically entwined and interlocked with other discontinuous fibers 116 forming the network 114 of the fiber layer 104.

In an exemplary embodiment, the discontinuous fibers 116 of the fiber layer 104 include, or are made of, a carbonaceous material. As examples, the discontinuous fibers 116 of the fiber layer 104 may be selected from a variety of suitable materials including, for example, without limitation, carbon nanotubes, graphene platelets, carbon whiskers, chopped carbon fibers, milled carbon fibers and carbon nanofibers. As an example, the carbon nanotubes may be single wall nanotubes (SWNT), double wall nanotubes (DWNT) or other multi-wall nanotubes (MWNT). Various other allotropes of carbon are also contemplated.

The carbonaceous material provides increased electrical conductivity and improved stiffness to the fiber-modified interlayer 100, as compared to the thermoplastic continuous fibers 110 of the nonwoven fabric layer 102. Thus, the combination of stiff, conductive discontinuous fibers 116 of the fiber layer 104 may impart conductivity to the thermoplastic continuous fibers 110 of the nonwoven fabric layer 102, thereby allowing the composite structure made using the fiber-modified interlayer 100 to be grounded and reduce or eliminate charging of the composite structure in order to dissipate electromagnetic effects (EME) and/or prevent edge glow, for example, during a lightning strike.

Further, the mechanical properties of the materials of the discontinuous fibers 116 of the fiber layer 104 may improve or enhance the mechanical properties, e.g., stiffness, of the nonwoven fabric layer 102, thereby offsetting some of the potential property loss of the composite structure made using the fiber-modified interlayer 100 (e.g., improve composite property retention) at elevated temperatures.

In yet other example embodiments, the discontinuous fibers 116 of the fiber layer 104 may also be selected from among any type of fibrous materials that are compatible with a papermaking process. As examples, the discontinuous fibers 116 of the fiber layer 104 may be include, for example, without limitation, nanocellulose fibers, polyaramid (e.g. Kevlar®) fibers and metal fibers.

Each of the discontinuous fibers 116 of the fiber layer 104 may have any size and/or geometry, for example, according to the particular application for the fiber-modified interlayer 100 and the resulting composite material. As an example, the discontinuous fibers 116 making up the fiber layer 104 may have median length of at least approximately 5 micrometers (μm). As another example, the discontinuous fibers 116 making up the fiber layer 104 may have median length of at least approximately 0.05 millimeters (mm). As another example, the discontinuous fibers 116 making up the fiber layer 104 may have median length of at least approximately 0.1 mm. As another example, the discontinuous fibers 116 making up the fiber layer 104 may have median length of between at least approximately 0.2 mm and at least approximately 0.5 mm. As another example, the discontinuous fibers 116 making up the fiber layer 104 may have median length of between at least approximately 0.5 mm and at least approximately 1 mm. As yet another example, the discontinuous fibers 116 making up the fiber layer 104 may have median length of between at least approximately 1 mm and at least approximately 5 mm. As an example, the discontinuous fibers 116 making up the fiber layer 104 may have a diameter of between approximately 1 nanometer (nm) and approximately 50 nm. As another example, the discontinuous fibers 116 making up the fiber layer 104 may have a diameter of between approximately 5 nm and approximately 10 nm.

As illustrated in FIG. 2, the network 114 of discontinuous fibers 116 forming the fiber layer 104 is built up or formed on and bonded (e.g., mechanically bonded) to opposed surfaces of the structure 112 of continuous fibers 110 forming the nonwoven fabric layer 102. As an example, when forming the network 114 of the discontinuous fibers 116, first portion of the discontinuous fibers 116 may be mechanically bonded to (e.g., entwined and interlocked with) at least some of the continuous fibers 110 forming at least one surface of the nonwoven fabric layer 102 and a second portion of the discontinuous fibers 116 may be mechanically bonded to (e.g., entwined and interlocked with) the first portion of the discontinuous fibers 116. In an example embodiment, the fiber layer 104 includes a randomly oriented, uniformly distributed network 114 of discontinuous fiber 116 bonded to the nonwoven fabric layer 102.

Figure 3:
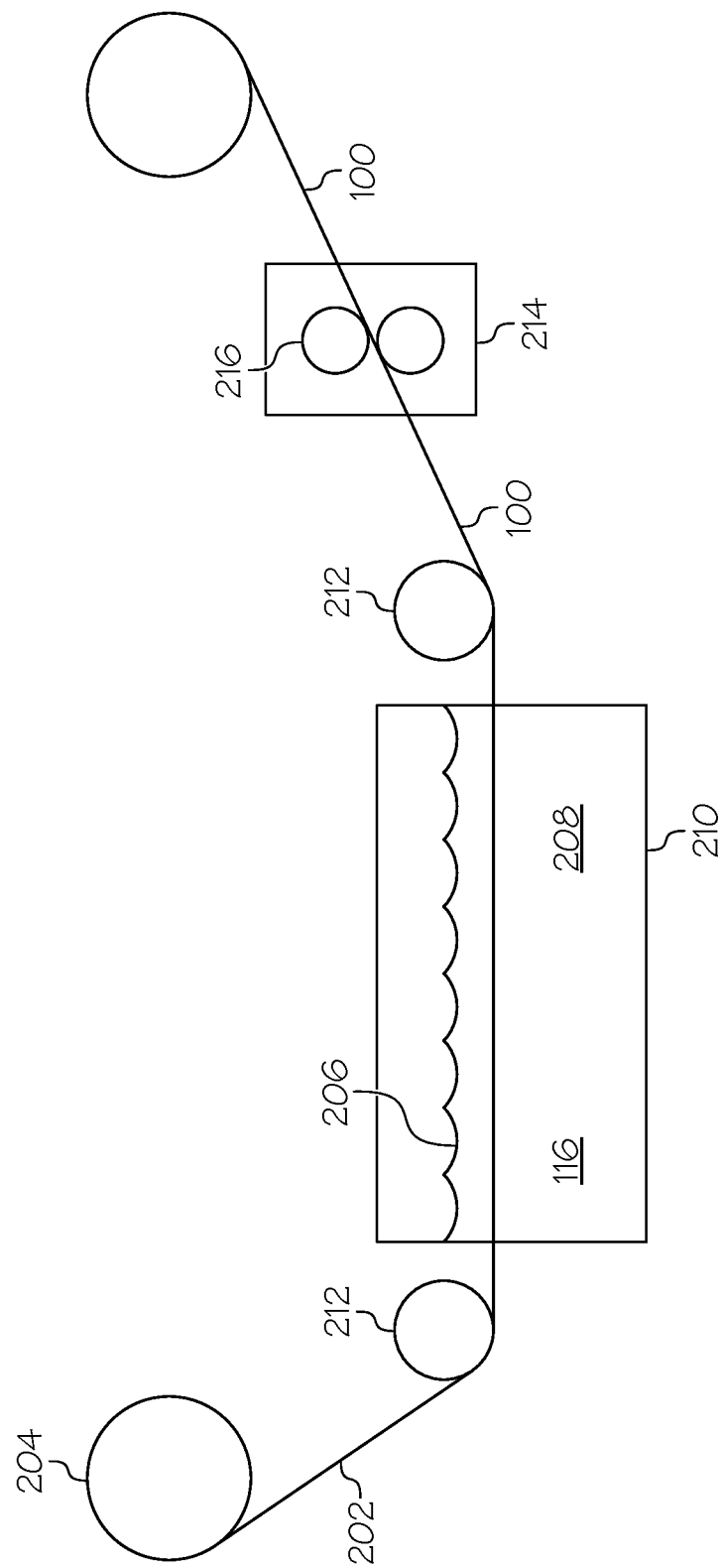
FIG. 3 is a schematic illustration of an embodiment of an apparatus for manufacturing the disclosed fiber-modified interlayer.

The density of the fiber layer 104 may depend upon various factors, for example and without limitation, the material composition of the nonwoven fabric layer 102, the intended application of the fiber-modified interlayer 100, the intended application of the composite member or structure made using the fiber-modified interlayer 100 and the like. In an example embodiment, the fiber layer 104 may be between approximately 0.1 percent and approximately 10 percent of the weight of the nonwoven fabric layer 102. In another example embodiment, the fiber layer 104 may be between approximately 0.1 percent and approximately 5 percent of the weight of the nonwoven fabric layer 102. In yet another example embodiment, the fiber layer 104 may be between approximately 0.25 percent and approximately 2.5 percent of the weight of the nonwoven fabric layer 102. As an example, the basis weight of the fiber layer 104 may be between approximately 0.1 grams per square meter (gsm) and approximately 2 gsm. The basis weight may be tailored by the thickness of the fiber layer 104. The thickness of the fiber layer 104 may depend, for example, upon the coating speed, the concentration of the fiber slurry 206 (FIG. 3) and/or the choice of dispersive liquid 208 (e.g., solvent) (FIG. 3). The uniformity of the fiber layer 104 may depend, for example, on dispersion quality and agglomerate size of the discontinuous fibers 116. As an example, the thickness of the fiber layer 104 may be tailored in the range of approximately 0.1 μm to approximately 10 μm. The resistance of the nonwoven fabric layer 102 (e.g., the nonwoven fabric 202) may be tailored, for example, based on the thickness of the fiber layer 104, in the range of between approximately 50 ohm/square and approximately 3,000 ohm/square.

In an example embodiment, at least a portion of the discontinuous fibers 116 of the fiber layer 104 may be at least partially interspersed through a thickness of the nonwoven fabric layer 102. In other words, at least some of the discontinuous fibers 116 may be mechanically entwined and interlocked with at least some of the continuous fibers 110 forming the structure 112 of the nonwoven fabric layer 102.

Figure 4:
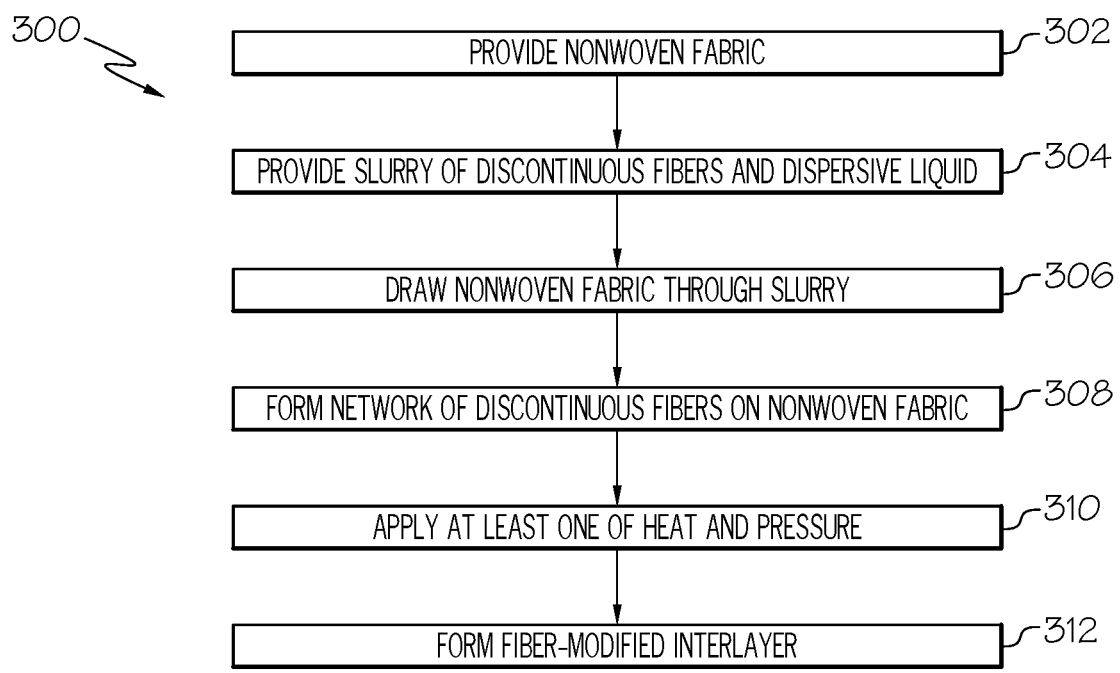
FIG. 4 is a flow diagram of an embodiment of the disclosed method for manufacturing the disclosed fiber-modified interlayer.

FIG. 3 is a schematic illustration of an exemplary embodiment of an apparatus 200 and process for manufacturing the fiber-modified interlayer 100. FIG. 4 is a flow diagram of an exemplary embodiment of the disclosed method 300 for manufacturing the fiber-modified interlayer 100. In the illustrative embodiment, a modified papermaking process may be used to make the fiber-modified interlayer 100. That is, the discontinuous fibers 116 are suspended in a dispersive liquid 208. As the nonwoven fabric 202 passes through the dispersive liquid, the discontinuous fibers 116 form on and bond to the nonwoven fabric 202.

As shown at block 302 (FIG. 4), a continuous sheet of the nonwoven fabric 202 is provided, for example, on a supply roll 204. As used herein, the term "continuous sheet" of material has its ordinary meaning as known to those skilled in the art and may include an elongated sheet having a length that is orders of magnitude greater than the width of the sheet. The nonwoven fabric 202, such as in the form of spunbonded, spunlaced, or mesh fabric, may be commercially available from a wide variety of sources.

As shown at block 304 (FIG. 4), a slurry 206 of the discontinuous fibers 116 and a dispersive liquid 208 is provided, for example, contained in a storage or mixing tank 210. As used herein, the term "slurry" has its ordinary meaning as known to those skilled in the art and may include a fluid mixture or suspension of the discontinuous fibers 116 suspended in the dispersive liquid 208.

In an example embodiment, the dispersive liquid 208 is water. Optionally, the dispersive liquid 208 may also include one or more compounds for improving and stabilizing the dispersion and suspension of the discontinuous fibers 116 in the dispersive liquid 208.

In another example embodiment, the dispersive liquid 208 may include other non-solvating liquids to disperse and suspend the discontinuous fibers 116. As used herein, the term "non-solvating" has its ordinary meaning as known to those skilled in the art and may include compounds in liquid form that are non-reactive essentially with the discontinuous fibers 116 and in which the discontinuous fibers 116 are essentially insoluble.

In yet another example embodiment, the dispersive liquid 208 may optionally include one or more surfactants (e.g., dispersant agents and anti-flocculants) to maintain the dispersing, formation, or dewatering of the discontinuous fibers 116 and the wet-laid network 114 forming the fiber layer 104.

Generally, the discontinuous fibers 116 are added to a quantity of the dispersive liquid 208 under mixing conditions using one or more agitation or dispersing devices, as known in the art. The slurry 206 has a concentration of discontinuous fibers 116 that is sufficiently high to adequately cover the surfaces of the nonwoven fabric 202 as it is drawn through the slurry 206. However, the slurry 206 is also configured to have a thickness, or concentration of discontinuous fibers 116, that is sufficiently low as to not tear or otherwise distort or damage the nonwoven fabric 202 as it is drawn through the slurry 206. As an example, the concentration of the discontinuous fibers 116 in the dispersive liquid 208 may be between approximately 0.05 gram per liter (g/L) and approximately 5 g/L. As another example, the percent by weight of the discontinuous fibers 116 in the slurry 206 may be between approximately 0.005 wt % and approximately 0.5 wt %.

As shown at block 306 (FIG. 4), the nonwoven fabric 202 is drawn through the slurry 206. As an example, the nonwoven fabric 202 may be supplied by and unrolled from the supply roll 204. In an example embodiment, a plurality of guide rollers 212, or pullers, are configured to draw the nonwoven fabric 202 from the supply roll 204 and into the slurry 206 and continuously pass the nonwoven fabric 202 through the slurry 206. The nonwoven fabric 202 is porous. As an example, the structure 112 of the continuous fibers 110 is configured to filter the discontinuous fibers 116 from the dispersive liquid 208 as the nonwoven fabric 202 passes through the slurry 206. In this example, the nonwoven fabric 202 may be pulled under relatively low tension. The tension applied to the nonwoven fabric 202 may be suitably selected based on the weight and/or strength of the nonwoven fabric 202 as to not tear, distort or otherwise damage the nonwoven fabric 202 as it is drawn through the slurry 206.

In another example embodiment, the nonwoven fabric 202 is supported and carried through the slurry 206 on a continuous porous belt (not explicitly illustrated). In this example, the belt carrying the nonwoven fabric 202 through the slurry 206 may be configured not to hinder or otherwise interfere with bonding of the discontinuous fibers 116 or formation of the fiber layer 104 on the surface of the nonwoven fabric 202 in contact with the belt. As an example, due to the flexible and light-weight nature of the material of the nonwoven fabric 202, the nonwoven fabric 202 may not be in constant intimate contact with the belt as it is drawn through the slurry 206, thus, allowing the discontinuous fibers 116 suspended in the dispersive liquid 208 to be filtered through the porous nonwoven fabric 202. As another example, the porosity of the belt is configured to not filter the discontinuous fibers 116 from the dispersive liquid 208 and allow the discontinuous fibers 116 to readily pass through the porous belt for contact and bonding with the nonwoven fabric 202. As examples, the porous belt may be a conveying belt having a plurality of openings, a mesh or a screen.

The processing line speed of the apparatus 200 and method 300 may vary depending, for example, upon the manufacturing environment, the thickness of the fiber layer 104 formed on the nonwoven fabric 202 (FIG. 3), the viscosity of the slurry 206 (FIG. 3), the strength of the nonwoven fabric 202 and the like. The processing speed may be configured to be as fast as possible based, for example, of the above factors, for to maximize throughput. In an example embodiment, processing speed may be between approximately 6 in/min and approximately 10 ft/min.

As shown at block 308 (FIG. 4), the network 114 of discontinuous fibers 116 is formed on the nonwoven fabric 202. As an example, as the nonwoven fabric 202 passes though the slurry 206, the discontinuous fibers 116 suspended in the dispersive liquid 208 are filtered through the porous nonwoven fabric 202. As the discontinuous fibers 116 are filtered by the nonwoven fabric 202, the discontinuous fibers 116 bond (e.g., mechanically bond) to the surfaces (e.g., the top surface 106 and bottom surface 108) (FIG. 1) of the nonwoven fabric 202 to build up the network 114 of discontinuous fibers 116 on, and at least partially through, the structure 112 of continuous fibers 110 of the nonwoven fabric 202. The built-up network 114 of discontinuous fibers 116 forms the fiber layers 104 on the nonwoven fabric layer 102 (FIG. 2).

As shown at block 312 (FIG. 4), optionally, at least one of heat and/or pressure may be applied to the fiber-modified interlayer 100. Application of pressure and/or heat to the fiber-modified interlayer 100 (e.g., the combination of the nonwoven fabric 202 and the discontinuous fibers 116) may further intersperse and integrate the discontinuous fibers 116 with the nonwoven fabric 202, dry the fiber-modified interlayer 100 by removing any excess amounts of the dispersive liquid 208 and consolidate the fiber-modified interlayer 100, for example, bonding the discontinuous fibers 116 with the nonwoven fabric 202 together. As an example, following the build up of the discontinuous fibers 116 on the nonwoven fabric 202 as it passes through the slurry 206, the fiber-modified interlayer 100 may pass through at least one of a heater 214 and/or a pair of pressure rollers 216.

As shown at block 312 (FIG. 4), the fiber-modified interlayer 100 is formed. As an example, the continuous sheet of the, e.g., dried, fiber-modified interlayer 100 is rolled onto and stored on a take-up product roll 218, for example, until further use in manufacturing a composite material.

In another example embodiment, the nonwoven fabric 202 may be dip coated within the slurry 206 of the discontinuous fibers 116 and a dispersive liquid 208. As an example, as the nonwoven fabric 202 is dipped in the slurry 206, the discontinuous fibers 116 suspended in the dispersive liquid 208 are filtered through the porous nonwoven fabric 202. As the discontinuous fibers 116 are filtered by the nonwoven fabric 202, the discontinuous fibers 116 bond (e.g., mechanically bond) to the surfaces (e.g., the top surface 106 and bottom surface 108) (FIG. 1) of the nonwoven fabric 202 to build up the network 114 of discontinuous fibers 116 on, and at least partially through, the structure 112 of continuous fibers 110 of the nonwoven fabric 202. The built-up network 114 of discontinuous fibers 116 forms the fiber layers 104 on the nonwoven fabric layer 102 (FIG. 2). In this embodiment, optionally, at least one of heat and/or pressure may be applied to the fiber-modified interlayer 100 after being withdrawn from the slurry 206.

In another example embodiment, the nonwoven fabric 202 may be laid up, for example, on a mandrel, and spray coated with the discontinuous fibers 116. As an example, the discontinuous fibers 116 are sprayed directly on one or both surfaces of the nonwoven fabric 202. As another example, the slurry 206 of the discontinuous fibers 116 and a dispersive liquid 208 may be sprayed on one or both surfaces of the nonwoven fabric 202. As the discontinuous fibers 116 are sprayed on the nonwoven fabric 202, the discontinuous fibers 116 bond (e.g., mechanically bond) to at least one surface (e.g., the top surface 106 and/or bottom surface 108) (FIG. 1) of the nonwoven fabric 202 to build up the network 114 of discontinuous fibers 116 on, and at least partially through, the structure 112 of continuous fibers 110 of the nonwoven fabric 202. The built-up network 114 of discontinuous fibers 116 forms the fiber layers 104 on the nonwoven fabric layer 102 (FIG. 2). In this embodiment, optionally, at least one of heat and/or pressure may be applied to the fiber-modified interlayer 100 after being sprayed.

Other methods of applying the discontinuous fibers 116 and forming the fiber layer 104 are also contemplated. As another example embodiment, the discontinuous fibers 116 may be applied to one or both surfaces of the nonwoven fabric 202 by an electrostatic coating process. As yet another example embodiment, the discontinuous fibers 116 may be applied to one or both surfaces of the nonwoven fabric 202 by an electrophoretic deposition process.

The disclosed fiber-modified interlayer 100 may be used to form an interlayer toughened-reinforcing fabric, which may then be used as a preform that is used to form a composite member or structure having a desired configuration. The fiber-modified interlayer 100, for example, the nonwoven fabric layer 102 of thermoplastic continuous fibers 110, provides for an increase in impact resistance and improved fracture toughness of the composite member. Further, the fiber-modified interlayer 100, for example, the fiber layer 104 of stiff, conductive, discontinuous fibers 116, provides for an increase in electrical conductivity and improved stiffness of the composite member, for example, at elevated temperatures.

Figure 5:
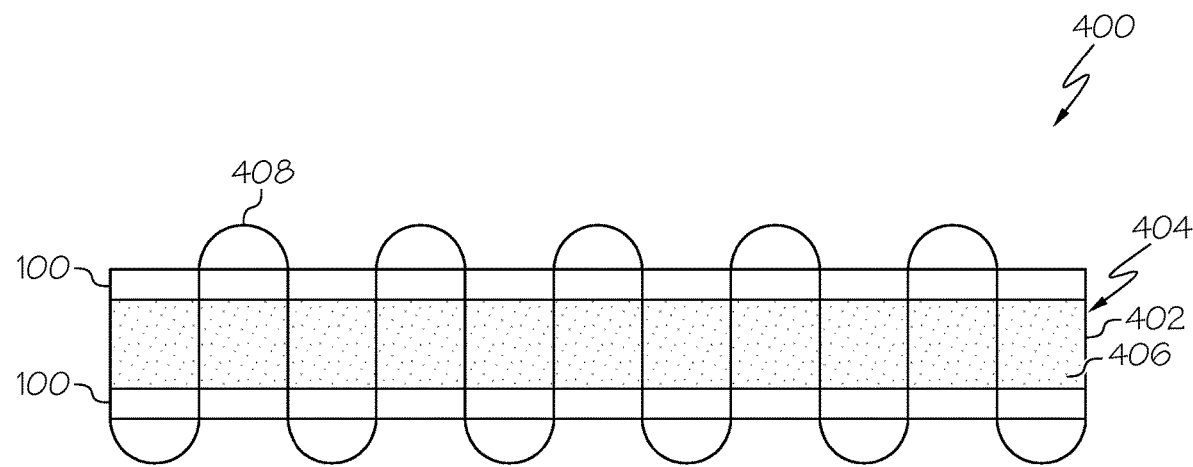
FIG. 5 is a schematic partial side view, in section, of an embodiment of the disclosed interlayer-toughened reinforcing fabric formed using the disclosed fiber-modified interlayer.

FIG. 5 is a schematic partial side view, in section, of an embodiment of the disclosed interlayer-toughened reinforcing fabric 400 formed using the fiber-modified interlayer 100. In this embodiment, the interlayer-toughened reinforcing fabric 400 is a unidirectional fabric. The interlayer-toughened reinforcing fabric 400 includes alternating layers of the reinforcing layer 402 and the fiber-modified interlayers 100. As described herein above, each fiber-modified interlayer 100 includes the nonwoven fabric layer 102 and fiber layers 104 (FIG. 1). The fiber-modified interlayers 100 are disposed between and bonded (e.g., knit-stitched) to the reinforcing layers 402.

In the illustrative embodiment, the interlayer-toughened reinforcing fabric 400 includes one reinforcing layer 402 and two fiber-modified interlayers 100. The reinforcing layer 402 is sandwiched between the opposed fiber-modified interlayers 100. In the illustrative embodiment, exterior (e.g., outermost) surfaces of the interlayer-toughened reinforcing fabric 400 are formed of the fiber-modified interlayers 100. However, in other embodiments, one exterior surface of the interlayer-toughened reinforcing fabric 400 may be formed from the reinforcing layer 402.

The interlayer-toughened reinforcing fabric 400 may be manufactured to produce a preform having a variety of dimensions. As an example, the preform produced from the interlayer-toughened reinforcing fabric 400 may be between approximately 12 inches (in) and 300 in long and at least approximately 50 in wide.

The reinforcing layer 402 includes, or is made of, structural tows 404 made of a reinforcing material. As an example, the reinforcing layer 402 includes a plurality of unidirectional tows 404 arranged generally parallel to one another. As used herein, the term "tow" has its ordinary meaning as known to those skilled in the art and may include an untwisted bundle of continuous filaments 406. As used herein, the term "unidirectional" has its ordinary meaning as known to those skilled in the art and may include reinforcing tows (e.g., continuous filaments or fibers) that are arranged in a single orientation or direction. The tows 404 may also be referred to as multifilament tows or multifilament yarns. As an example, each tow 404 may be made up of between approximately 1,000 and approximately 100,000 filaments 406. As an example, each tow 404 may be made up of between approximately 12,000 and approximately 24,000 filaments 406. However, in other examples, the size of tows 404 can be varied as needed to suit specific applications.

As used herein, the term "filament" has its ordinary meaning as known to those skilled in the art and may include one or more fibrous materials adapted for the reinforcing layer 402 for reinforcement of composite materials. As used herein, the term "continuous filament" has its ordinary meaning as known to those skilled in the art and may include an elongated filament (e.g., an elongated fibrous material) that extends across substantially the entire length or width of an associated reinforcing layer 402.

In an example embodiment, the tows 404 forming the reinforcing layer 402 are arranged parallel to each other in a single orientation or direction. Thus, the orientation or direction of the reinforcing layer 402 may be defined by the orientation or direction of the tows 404. As an example, the tows 404 are spread apart and positioned relative to each other to form a sheet of the continuous filaments 406 arranged in a single orientation or direction to form the reinforcing layer 402.

The tows 404 (e.g., the continuous filaments 406) are made of the reinforcement material. In an exemplary embodiment, the tows 404 of the reinforcing layer 402 include, or are made of, carbon fiber. In other words, the reinforcement material is carbon and the continuous filaments 406 forming the multifilament reinforcing tows 404 are continuous carbon filaments. In other example embodiments, the tows 404 may include, for example, without limitation, glass fiber, aramid fiber and the like. Other reinforcing materials for the tows 404 are also contemplated.

In the illustrative embodiment, the fiber-modified interlayers 100 are stitched (e.g., knit-stitched or sewed) to the reinforcing layers 402 with knit thread 408 to secure the fiber-modified interlayers 100 and the reinforcing layer 402 together. The thread 408 extends through the fiber-modified interlayers 100 and the reinforcing layer 402 in alternate directions to stabilize the interlayer-toughened reinforcing fabric 400 and maintain the orientation of the reinforcing layer 402 (e.g., the tows 404) in place, for example, during a lay up process and/or during infusion of a matrix material. As an example, the stitching (each stitch of the knit thread, also referred to collectively by reference numeral 408) may connect one or more of the fiber-modified interlayers 100 to the reinforcing layer 402.

The stitching 408 may be in various patterns, densities, and/or stitch-lengths depending on the nature of the reinforcing layer 402, the fiber-modified interlayer 100, the knit thread 408, etc. In an example embodiment, the knit thread 408 may form a tricot stitch. In other example embodiments, other stitch patterns may be used including, for example, without limitation, a lock stitch, a chain stitch, a zigzag knitting stitch and the like.

The thread 408 may be selected from a variety of suitable materials in various thicknesses including, for example, without limitation, polyester, polyester-polyarylate (e.g., Vectran®), polyaramid (e.g., Kevlar®), polybenzoxazole (e.g., Zylon®), Viscose (e.g., Rayon®), acrylic, polyamide, carbon, glass, fiberglass, aramid and the like.

Figure 6:
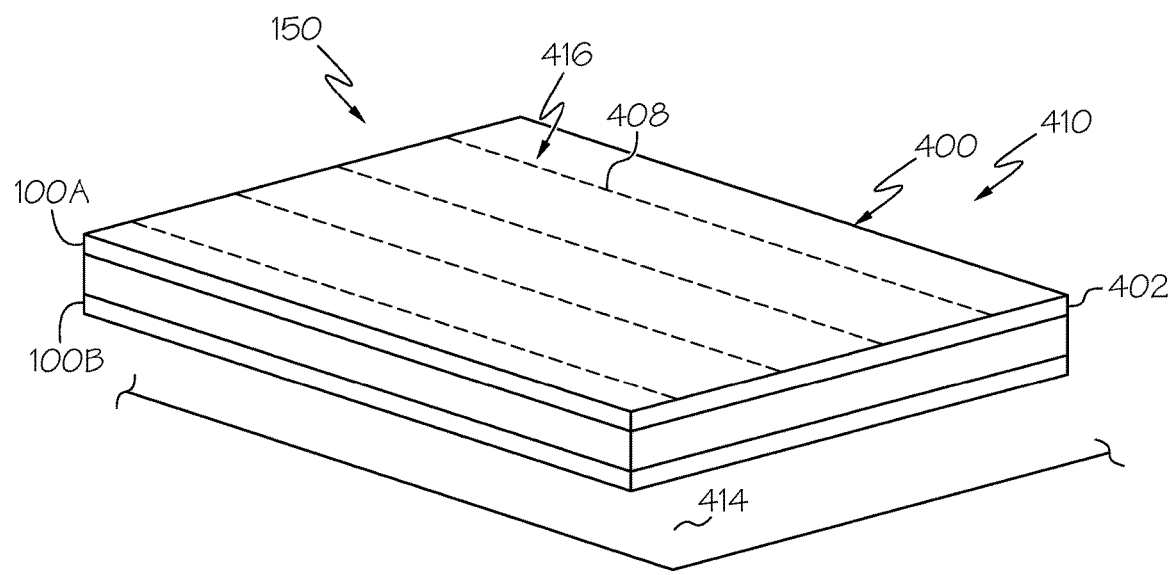
FIG. 6 is a schematic perspective view of an embodiment of a composite structure formed using the disclosed interlayer-toughened reinforcing fabric of FIG. 5.

FIG. 6 is a schematic perspective view of an embodiment of the composite structure 150 formed using the interlayer-toughened reinforcing fabric 400, for example, illustrated in FIG. 5. The interlayer-toughened reinforcing fabric 400 may be used as a preform 410 (e.g., a unidirectional preform). As an example, the preform 410 includes the reinforcing layer 402 with the fiber-modified interlayers 100 (identified individually as a first fiber-modified interlayer 100A and a second fiber-modified interlayer 100B) disposed on the outside of the reinforcing layer 402 and stitched (e.g., with the knit thread 408) to attach the reinforcing layer 402 and fiber-modified interlayers 100 together and form and stabilize the interlayer-toughened reinforcing fabric 400. Typically, each preform 410 has one reinforcing layer 402, however, the preform 410 may have more reinforcing layers 402. In other words, the interlayer-toughened reinforcing fabric 400 may be stacked so that they form an alternating fiber-modified interlayer 100/reinforcing layer 402/fiber-modified interlayer 100 arrangement.

In another example embodiment, the preform 410 may include a plurality of layers, or stack, of the interlayer-toughened reinforcing fabric 400. As an example, typically, each preform 410 has four or more layers of the interlayer-toughened reinforcing fabric 400. In other words, layers of the interlayer-toughened reinforcing fabric 400 may be stacked so that they form an alternating fiber-modified interlayer 100/reinforcing layer 402/fiber-modified interlayer 100/fiber-modified interlayer 100/reinforcing layer 402/fiber-modified interlayer 100, etc. arrangement. In this embodiment, each layer of the interlayer-toughened reinforcing fabric 400 may be oriented in the same direction. Optionally, when the fiber-modified interlayer 100 defines an exterior surface of the layup, another reinforcing layer (not explicitly illustrated) may be placed over that fiber-modified interlayer 100.

Figure 7:
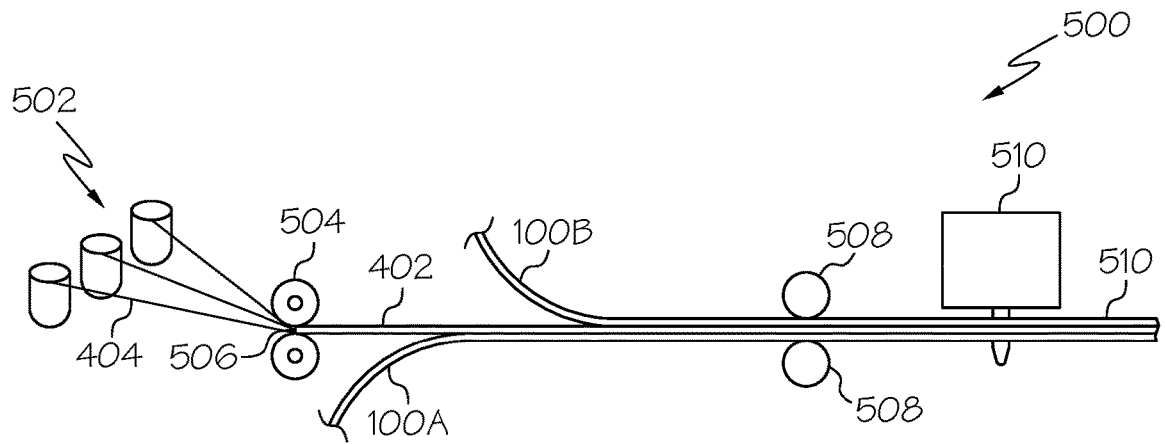
FIG. 7 is a schematic illustration of an embodiment of an apparatus for manufacturing the disclosed interlayer-toughened reinforcing fabric of FIG. 5.
Figure 8:
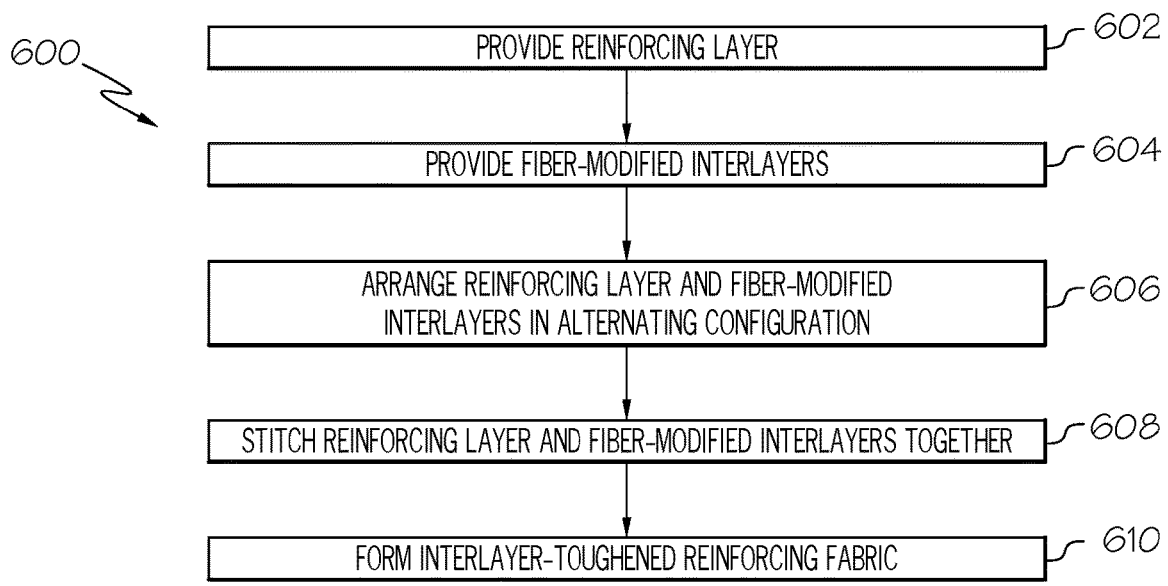
FIG. 8 is a flow diagram of an embodiment of the disclosed method for manufacturing the disclosed interlayer-toughened reinforcing fabric of FIG. 5.

FIG. 7 is a schematic illustration of an exemplary embodiment of an apparatus 500 and process for manufacturing the interlayer-toughened reinforcing fabric 400, for example, with one reinforcing layer 402 and two fiber-modified interlayers 100 (FIGS. 5 and 6). FIG. 8 is a flow diagram of an exemplary embodiment of the disclosed method 600 for manufacturing the interlayer-toughened reinforcing fabric 400.

A shown at block 602 (FIG. 8), the reinforcing layer 402 is provided. As an example, unidirectional tows 404 may be taken from one or more creels 502, e.g., containing multiple spools of the continuous filaments 406, and fed to a spreader 504. The spreader 504 is configured to spread the bundles of continuous filaments 406 of the tows 404, for example, forming spread-out tows 506, and form the reinforcing layer 402. The tows 404 are spread to a desired width and disposed at a desire orientation for the reinforcing layer 402.

As shown at block 604 (FIG. 8), a plurality (e.g., two) of the fiber-modified interlayers 100 is provided. As an example, the fiber-modified interlayers 100 may be provided in accordance with the process described herein above and illustrated in FIGS. 3 and 4.

As shown at block 606 (FIG. 8), the reinforcing layer 402 and the fiber-modified interlayers 100 are disposed or arranged in an alternating configuration. In the illustrative embodiment, two fiber-modified interlayers 100 (e.g., the first fiber-modified interlayer 100A and the second fiber-modified interlayer 100B) are stacked with the reinforcing layer 402 sandwiched between the first fiber-modified interlayer 100A and the second fiber-modified interlayer 100B.

However, in other embodiments more or less reinforcing layers 402 and/or fiber-modified interlayers 100 may be provided. In some cases, additional fiber-modified interlayers 100 and/or additional reinforcing layers 402 (not explicitly illustrated) may also be provided on the top and/or bottom of the interlayer-toughened reinforcing fabric 400.

The reinforcing layer 402 and the fiber-modified interlayers 100 are bonded or otherwise secured together. As shown at block 608 (FIG. 8), the reinforcing layers 402 and the fiber-modified interlayers 100 are stitched together with the knit thread 408 (FIG. 5). In the embodiment illustrated in FIG. 7, the reinforcing layer 402 and the fiber-modified interlayers 100 may pass through a nip between nip rollers 508. The reinforcing layer 402 and the fiber-modified interlayers 100 may then be processed by a knitting unit 510 that forms the stitches 408 in the interlayer-toughened reinforcing fabric 400.

As shown at block 610 (FIG. 8), the interlayer-toughened reinforcing fabric 400 is formed. As an example, the interlayer-toughened reinforcing fabric 400 may be used as the preform 410 in manufacturing the composite structure 150, as illustrated in FIG. 6.

Referring to FIG. 6, in an example embodiment, the interlayer-toughened reinforcing fabric 400 may be used as the preform 410 that is used to form a composite structure 150 (e.g., a composite laminate) having a desired configuration.

As an example, the preform 410 is disposed on a surface of a mold 414 and infused with a matrix material 416 (e.g., a thermosetting resin), for example, in a liquid-molding process, and then heated in the mold 414 to gel and set the matrix material 416. The fiber-modified interlayers 100 may be lightweight and porous to thereby minimize distortion of the reinforcing layer 402 and reduce the resistance of a flow of the matrix material 416 through the fiber-modified interlayers 100 during infusion of the reinforcing layer 402. In this example embodiment, the preform 410 is a unidirectional dry preform, i.e., there is no matrix material present in the interlayer-toughened reinforcing fabric 400.

As an example, once the desired number of layers of the interlayer-toughened reinforcing fabric 400 (e.g., the desired number of reinforcing layers 402 and fiber-modified interlayers 100 forming the preform 410) have been assembled on the surface of the mold 414 in the desired orientations, the composite laminate may be formed into the finished composite structure 150 using a variety of liquid-molding processes known in the art. Such methods include, for example, vacuum-assisted resin transfer molding (VARTM). In VARTM, a vacuum bag is placed over the preform 410, and the matrix material 416 (e.g., resin) is infused into the preform 410 using a vacuum-generated pressure differential. The composite laminate can then be placed in an autoclave, oven, etc. and heated to cure the resin.

In another example, a vacuum bag is placed over the preform 410, and the matrix material 416 (e.g., resin) is infused into the preform 410 under the vacuum bag while placed in an autoclave with the pressure reduced sufficiently to promote a double vacuum chamber of the vacuum chamber around the vacuum bag and the vacuum bag around the preform 410.

Other liquid-molding processes include resin transfer molding (RTM) and resin film infusion (RFI). In RTM, resin is infused under pressure into the preform 410 in a closed mold. In RFI, a semi-solid resin is placed underneath or on top of the preform 410, and a tool is positioned on top of the composite laminate. The composite laminate is then vacuum-bagged and placed in an autoclave to melt the semi-solid resin, causing it to infuse into the preform 410.

Figure 9:
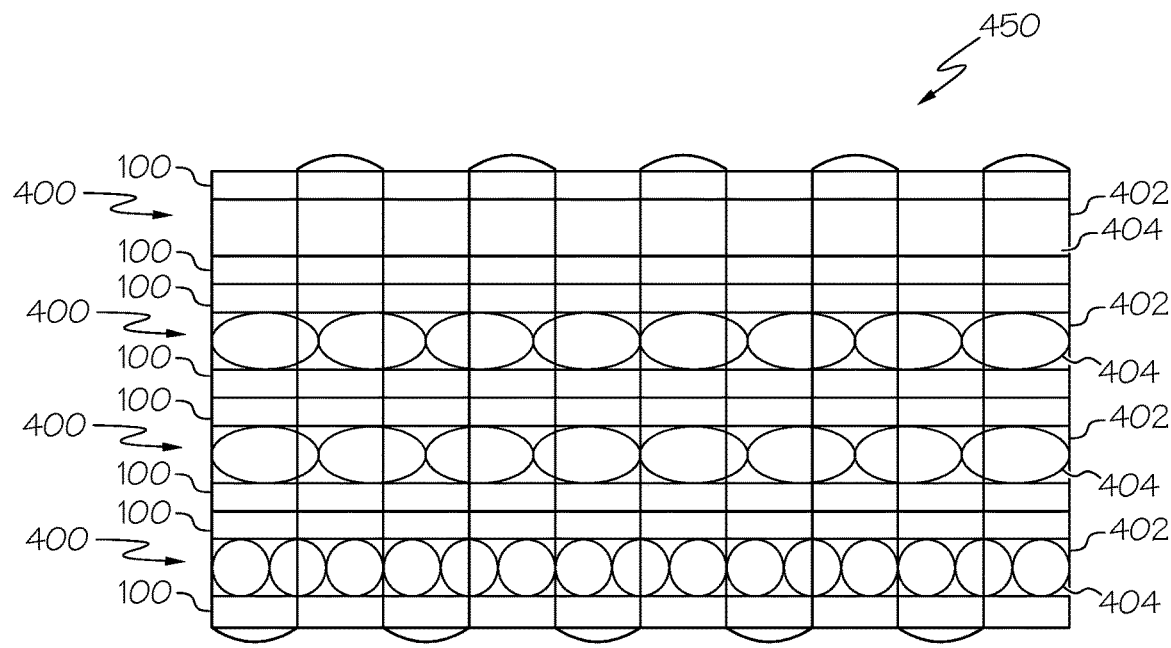
FIG. 9 is a schematic partial side view, in section, of another embodiment of the disclosed interlayer-toughened reinforcing fabric formed using the disclosed fiber-modified interlayer.

FIG. 9 is a schematic partial side view, in section, of another embodiment of the disclosed interlayer-toughened reinforcing fabric 450 formed using the fiber-modified interlayer 100. In this embodiment, the interlayer-toughened reinforcing fabric 450 may be a multiaxial fabric. The interlayer-toughened reinforcing fabric 450 includes alternating layers of the reinforcing layers 402 and the fiber-modified interlayers 100. As described herein above, each fiber-modified interlayer 100 includes the nonwoven fabric layer 102 and fiber layers 104 (FIG. 1). The fiber-modified interlayers 100 are disposed between and bonded (e.g., knit-stitched) to the reinforcing layers 402. As an example, the interlayer-toughened reinforcing fabric 450 includes a plurality of layers of the interlayer-toughened reinforcing fabric 400 (FIG. 5) in a stacked configuration.

In the illustrative embodiment, the interlayer-toughened reinforcing fabric 450 includes four layers of the interlayer-toughened reinforcing fabric 400 (FIG. 5). In other words, the interlayer-toughened reinforcing fabric 450 includes four reinforcing layers 402 and eight fiber-modified interlayers 100 with pairs of fiber-modified interlayers 100 disposed between adjacent ones of the reinforcing layers 402. However, the interlayer-toughened reinforcing fabric 450 may include other numbers and/or configurations of reinforcing layers 402 and fiber-modified interlayers 100. Typically, the interlayer-toughened reinforcing fabric 450 includes four or more reinforcing layers 402 with two fiber-modified interlayers 100 disposed between adjacent ones of the reinforcing layers 402. However, in other example embodiments, the interlayer-toughened reinforcing fabric 450 may include between two and sixteen or more reinforcing layers 402 with the fiber-modified interlayers 100 disposed between adjacent ones of the reinforcing layers 402. As an example, the interlayer-toughened reinforcing fabric 450 may include a plurality of reinforcing layers 402 with one fiber-modified interlayer 100 disposed between adjacent ones of the reinforcing layers 402. As another example, the interlayer-toughened reinforcing fabric 450 may include a plurality of reinforcing layers 402 with three fiber-modified interlayer 100 disposed between adjacent ones of the reinforcing layers 402.

Similarly, in the illustrative embodiment, at least one exterior (e.g., outermost) surface of the interlayer-toughened reinforcing fabric 450 is formed of the fiber-modified interlayer 100. As an example, various embodiments can include two or more reinforcing layers 402 with corresponding fiber-modified interlayers 100 between each reinforcing layer 402 and/or on the outside of the stack. However, in other example embodiments, one or both exterior surfaces of the interlayer-toughened reinforcing fabric 450 may be formed from the reinforcing layer 402.

In addition, the various fiber-modified interlayers 100 and reinforcing layers 402 may have different thicknesses, different material compositions, etc.

In the illustrative embodiment, the interlayer-toughened reinforcing fabric 400 is a multiaxial non-crimp fabric. As used herein, the term "non-crimp fabric" has its ordinary meaning as known to those skilled in the art and may include fabrics where multiple layers of reinforcing tows (e.g., continuous filaments or fibers) are laid upon each other (e.g., stacked) and transformed into a fabric by stitching, or, optionally, by application of a binder, such that the continuous tows remain straight and without a substantial crimp.

The interlayer-toughened reinforcing fabric 450 may be manufactured to produce a preform having a variety of dimensions. As an example, the preform produced from the interlayer-toughened reinforcing fabric 450 may be between approximately 12 inches (in) and 300 in long and at least approximately 50 in wide.

In an example embodiment, the tows 404 forming each of the reinforcing layers 402 are arranged parallel to each other in a single orientation or direction. Thus, the orientation or direction of each reinforcing layer 402 (or each layer of the interlayer-toughened reinforcing fabric 400 forming the interlayer-toughened reinforcing fabric 450) may be defined by the orientation or direction of the tows 404.

In the illustrative embodiment, the layers of the interlayer-toughened reinforcing fabric 400 are stitched (e.g., warp-stitched or sewed) to each other with thread 452 to secure the layers of the interlayer-toughened reinforcing fabric 400. The thread 452 extends through the fiber-modified interlayers 100 and the reinforcing layers 402 in alternate directions to stabilize the interlayer-toughened reinforcing fabric 450 and maintain the orientation of the reinforcing layers 402 in place, for example, during a lay up process and/or during infusion of a matrix material. As an example, each stitch of the thread (also referred to collectively by reference numeral 452) may connect one or more of the fiber-modified interlayers 100 to one or more of the reinforcing layers 402.

The stitching may be in various patterns, densities, and/or stitch-lengths depending on the nature of the reinforcing layer 402, the fiber-modified interlayer 100, the thread 452, etc. In an example embodiment, the thread 452 may form a tricot stitch. In other example embodiments, other stitch patterns may be used including, for example, without limitation, a lock stitch, a chain stitch, a zigzag knitting stitch and the like.

The thread 452 may be selected from a variety of suitable materials in various thicknesses including, for example, without limitation, polyester, polyester-polyarylate (e.g., Vectran®), polyaramid (e.g., Kevlar®), polybenzoxazole (e.g., Zylon®), Viscose (e.g., Rayon®), acrylic, polyamide, carbon, glass, fiberglass, aramid and the like.

Figure 10:
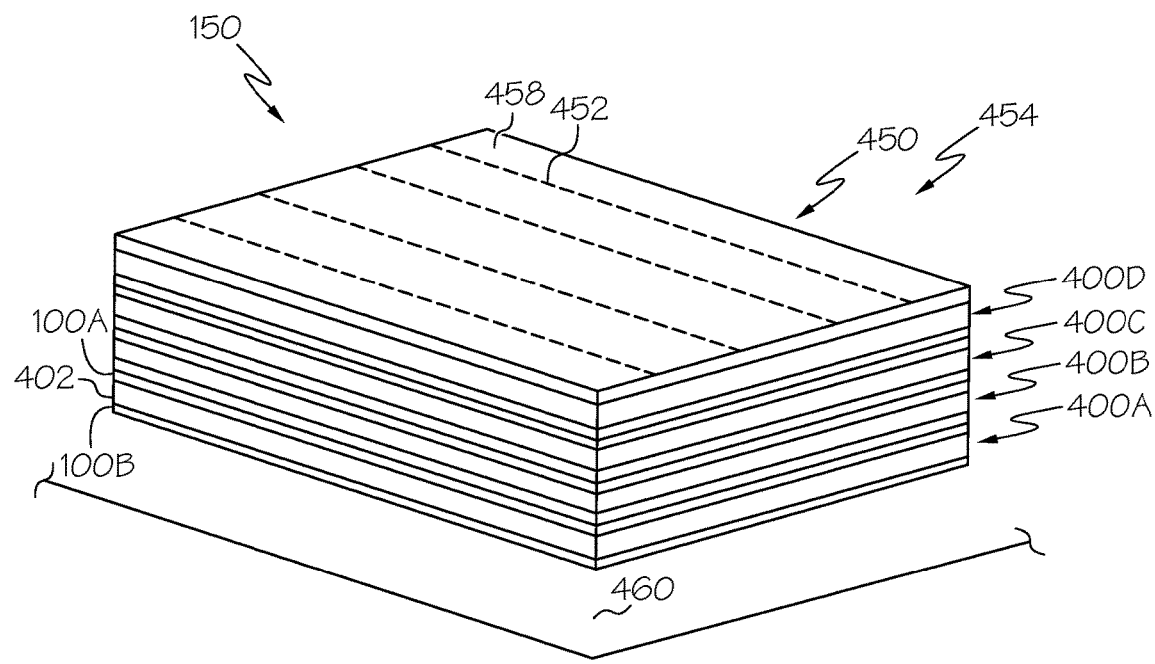
FIG. 10 is a schematic perspective view of another embodiment of the composite structure formed using the interlayer-toughened reinforcing fabric of FIG. 9.

FIG. 10 is a schematic perspective view of an embodiment of the composite structure 150 formed using the interlayer-toughened reinforcing fabric 450. The interlayer-toughened reinforcing fabric 450 may be used as a preform 454 (e.g., a multiaxial preform). As an example, the interlayer-toughened reinforcing fabric 450 includes a plurality of layers of the interlayer-toughened reinforcing fabric 400 (FIG. 5) (identified individually as a first interlayer-toughened reinforcing fabric 400A, a second interlayer-toughened reinforcing fabric 400B, a third interlayer-toughened reinforcing fabric 400C and a fourth interlayer-toughened reinforcing fabric 400D). Each one of the layers of the interlayer-toughened reinforcing fabric 400 includes the reinforcing layer 402 with the fiber-modified interlayers 100 (identified individually as the first fiber-modified interlayer 100A and the second fiber-modified interlayer 100B) disposed on the outside of the reinforcing layer 402. The layers of the interlayer-toughened reinforcing fabric 400 are stitched together (e.g., with the thread 452) to attach layers of the interlayer-toughened reinforcing fabric 400 (e.g., the reinforcing layers 402 and fiber-modified interlayers 100) together and form and stabilize the interlayer-toughened reinforcing fabric 450.

Typically, each preform 454 has four or more layers of the interlayer-toughened reinforcing fabric 400, however, the preform 454 may have fewer or more layers of the interlayer-toughened reinforcing fabric 400 (e.g., between two and sixteen or more layers of the interlayer-toughened reinforcing fabric 400). In other words, the interlayer-toughened reinforcing fabric 450 may be stacked so that they form an alternating fiber-modified interlayer 100/reinforcing layer 402/fiber-modified interlayer 100/fiber-modified interlayer 100/reinforcing layer 402/fiber-modified interlayer 100, etc. arrangement. In this embodiment, one or more layers of the interlayer-toughened reinforcing fabric 400 may be oriented in different direction than at least one other layer of the interlayer-toughened reinforcing fabric 400. Optionally, when the fiber-modified interlayer 100 defines an exterior surface of the layup, another reinforcing layer (not explicitly illustrated) may be placed over that fiber-modified interlayer 100.

In the example embodiments illustrated in FIGS. 9 and 10, the layers of the interlayer-toughened reinforcing fabric 400 forming the interlayer-toughened reinforcing fabric 450 may be laid-down in quasi-isotropic or orthotropic patterns. In other words, the layup angle of reinforcing layer 402 of the interlayer-toughened reinforcing fabric 400 forming at least one layer of the interlayer-toughened reinforcing fabric 450 may be oriented in different direction than the layup angle of reinforcing layer 402 of the interlayer-toughened reinforcing fabric 400 forming at least one other layer of the interlayer-toughened reinforcing fabric 450. The pattern may be repeated as needed to achieve a desired thickness of the finished composite structure 150. The repeated pattern may be constant, or may be varied across the preform 454. Where the repeated pattern is varied across the preform 454, locally different thicknesses may be mechanically held in place, such as by stitching the layers of the interlayer-toughened reinforcing fabric 400 together.

The numbers and layup angles of the layers of the interlayer-toughened reinforcing fabric 400 (e.g., reinforcing layer 402 forming the interlayer-toughened reinforcing fabric 400) are virtually infinitely adjustable. Typically, for a multiaxial composite structure 150, angles of 0°, 90°, plus or minus (±) 30°, ±45°, ±60° are set and the structure is selected such that a symmetrical structure with respect to the 0-degree-direction results.

As illustrated in FIGS. 9 and 10, as an example, the reinforcing layer 402 of the interlayer-toughened reinforcing fabric 400 (e.g., forming the layers or lamina of the interlayer-toughened reinforcing fabric 450) may be laid-down in a quasi-isotropic pattern. A quasi-isotropic pattern is one that approximates an isotropic material in the plane of the tows 404 (e.g., the continuous filaments or fibers). This is also known as transverse isotropy. As an example, and as also represented in FIG. 9, the first interlayer-toughened reinforcing fabric 400A is disposed at 0°, defining the transverse direction of the interlayer-toughened reinforcing fabric 400, the second interlayer-toughened reinforcing fabric 400B is disposed at +45° relative to the transverse direction, the third interlayer-toughened reinforcing fabric 400C is disposed at a −45° relative to the transverse direction and the fourth interlayer-toughened reinforcing fabric 400D is disposed at 90° relative to the transverse direction. Other quasi-isotropic patterns are also contemplated, including, for example, without limitation, a 0°/+45°/90°/−45° pattern, a +45°/0°/−45°/90° pattern, a −45°/0°/+45°/90°, a 0°/+60°/−60° pattern and the like.

Alternatively, the reinforcing layer 402 of the interlayer-toughened reinforcing fabric 400 (e.g., forming the layers or lamina of the interlayer-toughened reinforcing fabric 450) may be laid-down in an orthotropic pattern. Orthotropic means having the tows 404 (e.g., continuous filaments or fibers) such that the net result is not quasi-isotropic in plane like the quasi-isotropic patterns described above. An example of an orthotropic pattern is one with 44% of the tows 404 at 0°, 22% of the tows 404 at +45°, 22% of the tows 404 at −45° and 12% of the tows 404 at 90°.

Figure 11:
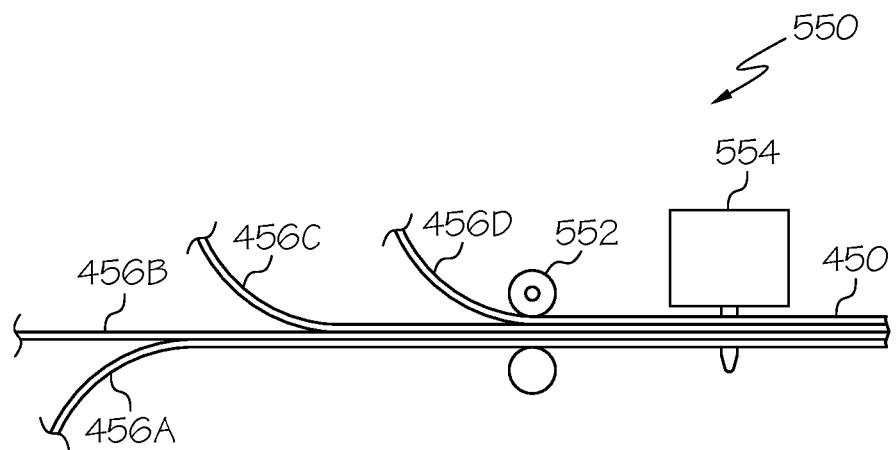
FIG. 11 is a schematic illustration of an embodiment of an apparatus for manufacturing the interlayer-toughened reinforcing fabric of FIG. 9.
Figure 12:
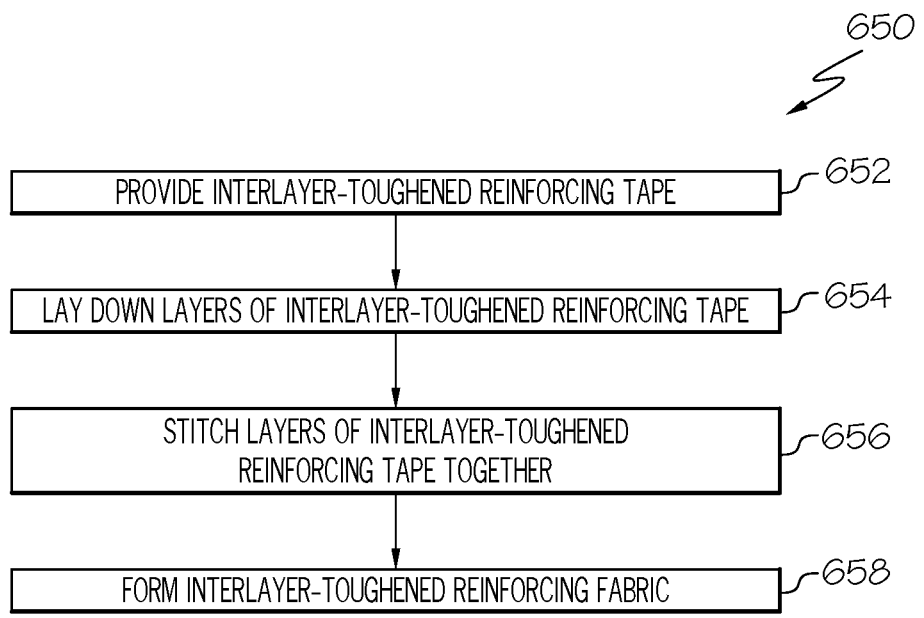
FIG. 12 is a flow diagram of an embodiment of the disclosed method for manufacturing the interlayer-toughened reinforcing fabric of FIG. 9.

FIG. 11 is a schematic illustration of an exemplary embodiment of an apparatus 550 and process for manufacturing the interlayer-toughened reinforcing fabric 450, for example, with multiple reinforcing layers 402 and multiple fiber-modified interlayers 100 (FIGS. 9 and 10). FIG. 12 is a flow diagram of an exemplary embodiment of the disclosed method 650 for manufacturing the interlayer-toughened reinforcing fabric 450.

A shown at block 652 (FIG. 8), a plurality of layers of the interlayer-toughened reinforcing fabric 400 is provided. As an example, the interlayer-toughened reinforcing fabric 400 may take the form of a unidirectional interlayer-toughened reinforcing tape 456 (FIG. 11). For example, the apparatus 500 (FIG. 7) may be a tape-production unit and the interlayer-toughened reinforcing fabric 400 (FIGS. 5-7) made using the apparatus 500 may be the interlayer-toughened reinforcing tape 456.

The apparatus 550 (e.g., a fabric-production unit) may produce the interlayer-toughened reinforcing fabric 450 from the interlayer-toughened reinforcing tape 456 (identified individually as a first interlayer-toughened reinforcing tape 456A, a second interlayer-toughened reinforcing tape 456B, a third interlayer-toughened reinforcing tape 456C and a fourth interlayer-toughened reinforcing tape 456D). As such, and referring back to FIG. 10, the first interlayer-toughened reinforcing tape 456A forms (or corresponds to) the first layer of the interlayer-toughened reinforcing fabric 400A of the interlayer-toughened reinforcing fabric 450, the second interlayer-toughened reinforcing tape 456B forms (or corresponds to) the second layer of the interlayer-toughened reinforcing fabric 400B of the interlayer-toughened reinforcing fabric 450, the third interlayer-toughened reinforcing tape 456C forms (or corresponds to) the third layer of the interlayer-toughened reinforcing fabric 400C of the interlayer-toughened reinforcing fabric 450, the fourth interlayer-toughened reinforcing tape 456D forms (or corresponds to) the fourth layer of the interlayer-toughened reinforcing fabric 400D of the interlayer-toughened reinforcing fabric 450, etc.

As an example, the apparatus 550 may be implemented using any standard fabrication production unit. A non-limiting example is a knitting machine. A knitting machine may be modified to use the interlayer-toughened reinforcing tape 456 instead of tows, which is normally used to create a fabric.

As shown at block 654 (FIG. 8), layers of the interlayer-toughened reinforcing tape 456 is laid down. As an example, the apparatus 550 (FIG. 11) may use rolls of interlayer-toughened reinforcing tape 456 to lay down material for making the interlayer-toughened reinforcing fabric 450. The interlayer-toughened reinforcing tape 456 may be laid down in different angles with respect to each other to generate the interlayer-toughened reinforcing fabric 450. As an example, the apparatus 550 pulls the interlayer-toughened reinforcing tape 456 onto a surface and cuts the interlayer-toughened reinforcing tape 456 into appropriate sizes, for example, generally the width of a moving bed of the apparatus 550.

The layers of the interlayer-toughened reinforcing tape 456 are bonded or otherwise secured together. As shown at block 656, the layers of the interlayer-toughened reinforcing tape 456 are stitched together with the thread 452 (FIGS. 9 and 10). As an example, lengths of the interlayer-toughened reinforcing tape 456 is pulled onto the surface and placed onto multiple orientations and knitted or stitched together to form the interlayer-toughened reinforcing fabric 450. In the embodiment illustrated in FIG. 11, the arranged layers of the interlayer-toughened reinforcing tape 456 may pass through a nip between nip rollers 552. The layers of the interlayer-toughened reinforcing tape 456 may then be processed by a knitting unit 554 that forms the stitches 452 in the interlayer-toughened reinforcing fabric 450.

As shown at block 658 (FIG. 8), the interlayer-toughened reinforcing fabric 450 is formed. As an example, the interlayer-toughened reinforcing fabric 450 may be used as the preform 454 in manufacturing the composite structure 150, as illustrated in FIG. 10.

Referring to FIG. 10, in various example embodiments, the interlayer-toughened reinforcing fabric 450 may be used as the preform 454 that is used to form a composite structure 150 (e.g., a composite laminate) having a desired configuration.

As an example, the preform 454 is disposed on a surface of a mold 460 and infused with a matrix material 458 (e.g., a thermosetting resin), for example, in a liquid-molding process, and then heated in the mold 460 to gel and set the matrix material 458. The fiber-modified interlayers 100 may be lightweight and porous to thereby minimize distortion of the reinforcing layers 402 and reduce the resistance of a flow of the matrix material 458 through the fiber-modified interlayers 100 during infusion of the reinforcing layers 402. In this example embodiment, the preform 454 is a multiaxial dry preform, i.e., there is no matrix material present in the interlayer-toughened reinforcing fabric 450.

As an example, once the desired number of layers of the interlayer-toughened reinforcing fabric 450 have been assembled on the surface of the mold 460 in the desired orientations, the composite laminate may be formed into the finished composite structure 150 using a variety of liquid-molding processes known in the art. Such methods include, for example, vacuum-assisted resin transfer molding (VARTM). In VARTM, a vacuum bag is placed over the preform 454, and the matrix material 458 (e.g., resin) is infused into the preform 454 using a vacuum-generated pressure differential. The composite laminate can then be placed in an autoclave, oven, etc. and heated to cure the resin.

In another example, a vacuum bag is placed over the preform 454, and the matrix material 458 (e.g., resin) is infused into the preform 454 under the vacuum bag while placed in an autoclave with the pressure reduced sufficiently to promote a double vacuum chamber of the vacuum chamber around the vacuum bag and the vacuum bag around the preform 454.

Other liquid-molding processes include resin transfer molding (RTM) and resin film infusion (RFI). In RTM, resin is infused under pressure into the preform 454 in a closed mold. In RFI, a semi-solid resin is placed underneath or on top of the preform 454, and a tool is positioned on top of the composite laminate. The composite laminate is then vacuum-bagged and placed in an autoclave to melt the semi-solid resin, causing it to infuse into the preform 454.

Figure 13:
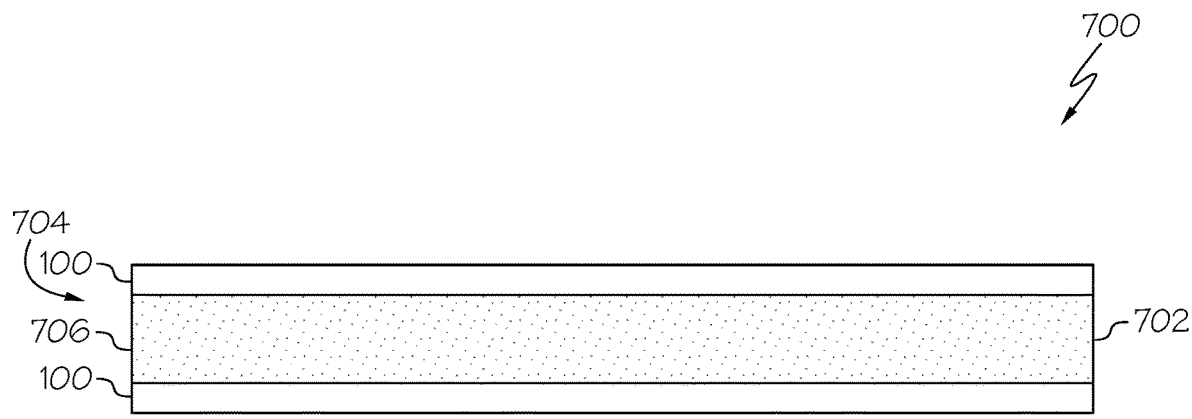
FIG. 13 is a schematic partial side view, in section, of another embodiment of the disclosed interlayer-toughened reinforcing fabric formed using the disclosed fiber-modified interlayer.

FIG. 13 is a schematic partial side view, in section, of another embodiment of the disclosed interlayer-toughened reinforcing fabric 700 formed using the fiber-modified interlayer 100. In this embodiment, the interlayer-toughened reinforcing fabric 700 is a unidirectional fabric. The interlayer-toughened reinforcing fabric 700 includes alternating layers of a reinforcing layer 702 and the fiber-modified interlayers 100. As described herein above, each fiber-modified interlayer 100 includes the nonwoven fabric layer 102 and fiber layers 104 (FIG. 1). The reinforcing layers 402 is disposed between and bonded (e.g., melt-bonded) to the fiber-modified interlayers 100.

In the illustrative embodiment, the interlayer-toughened reinforcing fabric 700 includes two fiber-modified interlayers 100 and one reinforcing layers 702 disposed between adjacent ones of the fiber-modified interlayers 100. However, the interlayer-toughened reinforcing fabric 400 may include other numbers and/or configurations of reinforcing layers 402 and fiber-modified interlayers 100. As an example, the interlayer-toughened reinforcing fabric 700 may include one reinforcing layer 702 with one fiber-modified interlayer 100 bonded to one or both surfaces (e.g., sides) of the reinforcing layer 702 to produce the interlayer-toughened reinforcing fabric 700.

In addition, the various fiber-modified interlayers 100 and reinforcing layers 702 may have different thicknesses, different material compositions, etc.

In the illustrative embodiment, the interlayer-toughened reinforcing fabric 700 is a unidirectional fabric.

Each of the reinforcing layers 702 includes, or is made of, structural tows 704 made of a reinforcing material. As an example, the reinforcing layer 702 includes a plurality of non-crimp, unidirectional tows 704 arranged generally parallel to one another. The tows 704 include an untwisted bundle of continuous filaments 706. As an example, the tows 704 are spread apart and positioned relative to each other to form a sheet of the continuous filaments 706 arranged in a single orientation or direction to form the reinforcing layer 702.

The tows 704 (e.g., the continuous filaments 706) are made of the reinforcement material. In an exemplary embodiment, the tows 704 of the reinforcing layer 702 include, or are made of, carbon fiber. In other words, the reinforcement material is carbon and the continuous filaments 706 forming the multifilament reinforcing tows 704 are continuous carbon filaments. In other example embodiments, the tows 704 may include, for example, without limitation, glass fiber, aramid fiber and the like. Other reinforcing materials for the tows 404 are also contemplated.

The fiber-modified interlayers 100 are melt-bonded to the reinforcing layer 702 to secure the fiber-modified interlayers 100 and the reinforcing layer 702 together. In the illustrative embodiment, two fiber-modified interlayers 100 are melt-bonded to both sides of the reinforcing layer 702. However, in another embodiment, the fiber-modified interlayers 100 may be melt-bonded to only one side of the reinforcing layer 702.

Figure 14:
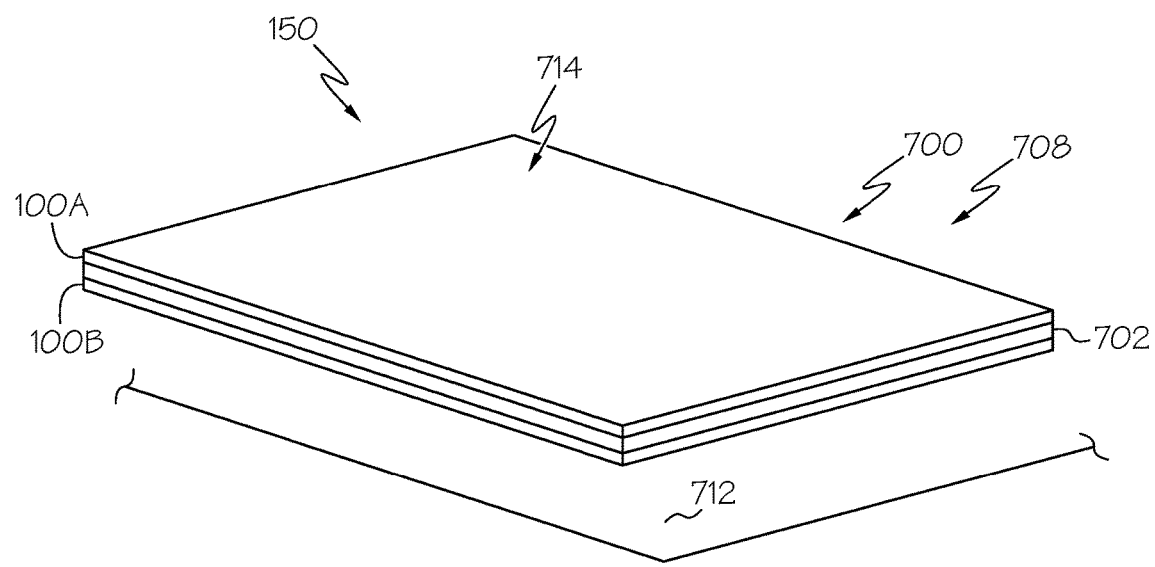
FIG. 14 is a schematic perspective view of another embodiment of the composite structure formed using the interlayer-toughened reinforcing fabric of FIG. 13.

FIG. 14 is a schematic perspective view of another embodiment of the composite structure 150 formed using the interlayer-toughened reinforcing fabric 700. The interlayer-toughened reinforcing fabric 700 may be used as a preform 708 (e.g., a unidirectional preform). As an example, the preform 708 includes at least one reinforcing layer 702 disposed between two fiber-modified interlayers 100 (identified individually as a first fiber-modified interlayer 100A and a second fiber-modified interlayer 100B). Typically, each preform 708 has one reinforcing layer 702, however, the preform 708 may have more reinforcing layers 702. In other words, the interlayer-toughened reinforcing fabric 700 may be stacked so that they form an alternating fiber-modified interlayer 100/reinforcing layer 702/fiber-modified interlayer 100 arrangement. Optionally, another reinforcing layer (not explicitly illustrated) may be placed over an outermost one of the fiber-modified interlayers 100 such that the interlayer-toughened reinforcing fabric 700 may be stacked so that they form an alternating fiber-modified interlayer 100/reinforcing layer 702/fiber-modified interlayer 100/reinforcing layer 702 arrangement.

In another example embodiment, the preform 708 may include a plurality of layers, or stack, of the interlayer-toughened reinforcing fabric 700. As an example, typically, each preform 708 has four or more layers of the interlayer-toughened reinforcing fabric 700. In other words, layers of the interlayer-toughened reinforcing fabric 700 may be stacked so that they form an alternating fiber-modified interlayer 100/reinforcing layer 702/fiber-modified interlayer 100/fiber-modified interlayer 100/reinforcing layer 702/fiber-modified interlayer 100, etc. arrangement. In an example of this embodiment, each layer of the interlayer-toughened reinforcing fabric 700 may be oriented in the same direction (e.g., a unidirectional preform). In another example of this embodiment, one or more layers of the interlayer-toughened reinforcing fabric 700 may be oriented in a different direction than at least one other layer of the of the interlayer-toughened reinforcing fabric 700 (e.g., a multiaxial preform). Optionally, when the fiber-modified interlayer 100 defines an exterior surface of the layup, another reinforcing layer (not explicitly illustrated) may be placed over that fiber-modified interlayer 100.

Figure 15:
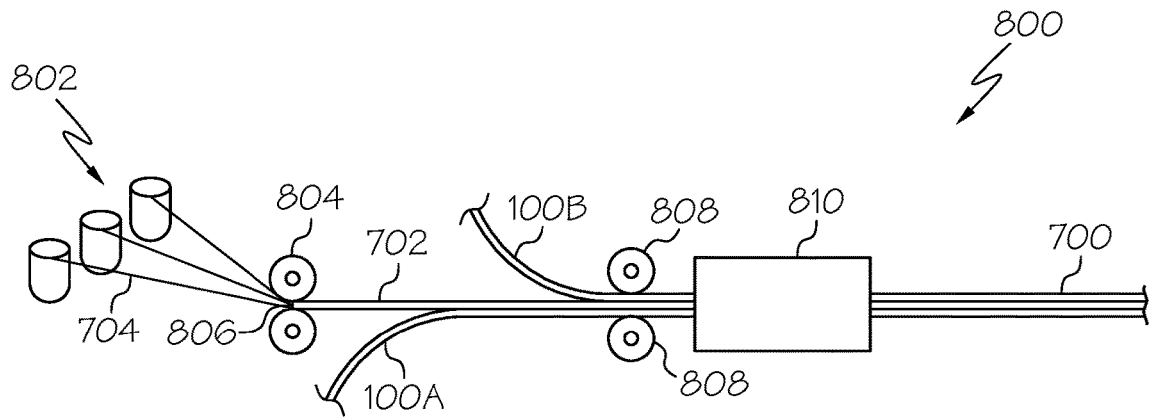
FIG. 15 is a schematic illustration of an embodiment of an apparatus for manufacturing the interlayer-toughened reinforcing fabric of FIG. 13.
Figure 16:
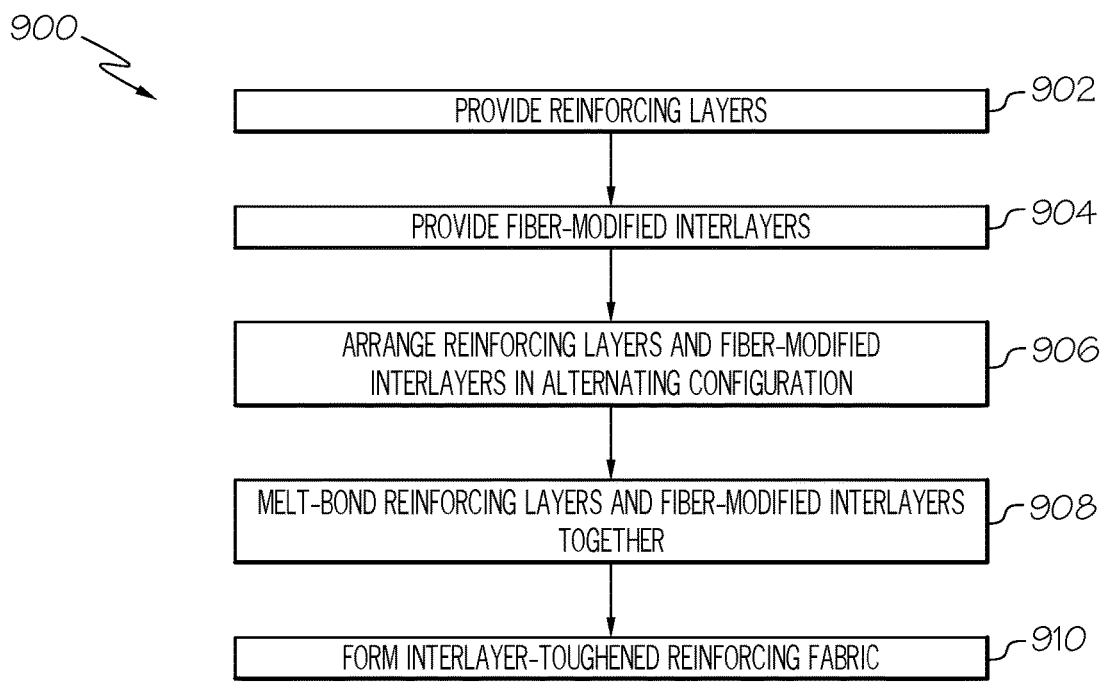
FIG. 16 is a flow diagram of an embodiment of the disclosed method for manufacturing the interlayer-toughened reinforcing fabric of FIG. 13.

FIG. 15 is a schematic illustration of an exemplary embodiment of an apparatus 800 and process for manufacturing the interlayer-toughened reinforcing fabric 700, for example, with one reinforcing layer 402 and two fiber-modified interlayers 100 (FIGS. 13 and 14). FIG. 16 is a flow diagram of an exemplary embodiment of the disclosed method 900 for manufacturing the interlayer-toughened reinforcing fabric 700.

A shown at block 902 (FIG. 16), at least one reinforcing layer 702 is provided. As an example, the unidirectional tows 704 may be taken from one or more creels 802, e.g., containing multiple spools of the continuous filaments 706, and fed to a spreader 804. The spreader 804 is configured to spread the continuous filaments 706 within the bundles from the tows 704 to form spread-out tows 806 that form each reinforcing layer 702. The tows 704 are spread to a desired width and disposed at a desire orientation for the reinforcing layer 702.

As shown at block 904 (FIG. 16), a plurality of the fiber-modified interlayers 100 is provided. As an example, the fiber-modified interlayers 100 may be provided in accordance with the process described herein above and illustrated in FIGS. 3 and 4.

As shown at block 906 (FIG. 16), the reinforcing layer 702 and the fiber-modified interlayers 100 are disposed or arranged in an alternating configuration. In the illustrative embodiment, two fiber-modified interlayers 100 (e.g., the first fiber-modified interlayer 100A and the second fiber-modified interlayer 100B) are stacked with one reinforcing layer 702 (e.g., therebetween.

However, in other embodiments more or less reinforcing layers 702 and/or fiber-modified interlayers 100 may be provided. In some cases, additional reinforcing layers 702 (not explicitly illustrated) may also be provided on the top and/or bottom of the interlayer-toughened reinforcing fabric 700. In some cases, the interlayer-toughened reinforcing fabric 700 may include only the reinforcing layer 702 between the first fiber-modified interlayer 100A and the second fiber-modified interlayer 100B, or the reinforcing layer 402A in combination with one or more additional reinforcing layers.

The reinforcing layer 702 and the fiber-modified interlayers 100 are bonded or otherwise secured together. As shown at block 908 (FIG. 16), the reinforcing layer 702 and the fiber-modified interlayers 100 are melt-bonded together. In the illustrative embodiment, the reinforcing layers 702 and the fiber-modified interlayers 100 may, for example, pass between heated rollers 808 and/or through an over 810 to produce a consolidated interlayer-toughened reinforcing fabric 700 having the fiber-modified interlayers 100 melt-bonded to the reinforcing layer 702.

As shown at block 910 (FIG. 16), the interlayer-toughened reinforcing fabric 700 is formed. As an example, the interlayer-toughened reinforcing fabric 700 may be used as the preform 708 in manufacturing the composite structure 150, as illustrated in FIG. 14.

Referring again to FIG. 14, in this example embodiment, the interlayer-toughened reinforcing fabric 700 may be used as the preform 708 that is used to form a composite structure 150 (e.g., a composite laminate) having a desired configuration. As an example, the preform 708 is disposed on a surface of a mold 712 and infused with a matrix material 714 (e.g., a thermosetting resin), for example, in a liquid-molding process, and then heated in the mold 712 to gel and set the matrix material 714. The fiber-modified interlayers 100 may be lightweight and porous to thereby minimize distortion of the reinforcing layer 702 and reduce the resistance of a flow of the matrix material 714 through the fiber-modified interlayers 100 during infusion of the reinforcing layers 702. In this example embodiment, the preform 708 is a dry preform, i.e., there is no matrix material present in the interlayer-toughened reinforcing fabric 700.

In another example embodiment, the interlayer-toughened reinforcing fabric 700 may be pre-impregnated with the matrix material (e.g., an epoxy resin) and partially cured (i.e., a prepreg) before being place on the mold 712. In this example embodiment, the preform 752 is a wet preform, i.e., there is matrix material present in the interlayer-toughened reinforcing fabric 700.

Figure 17:
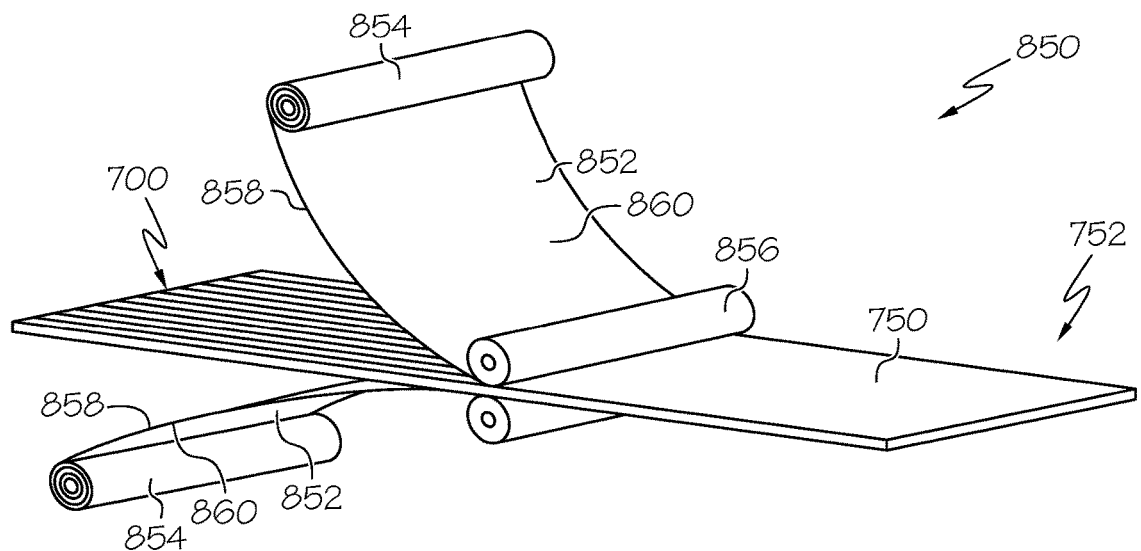
FIG. 17 is a schematic illustration of an embodiment of an apparatus for manufacturing a pre-impregnated interlayer-toughened reinforcing fabric.

FIG. 17 is a schematic illustration of an example embodiment of an apparatus 850 and process for manufacturing a pre-impregnated interlayer-toughened reinforcing fabric 750. In the illustrative embodiment, the interlayer-toughened reinforcing fabric 700 may be disposed between two layers of resin-film-coated release paper 852 fed from supply rolls 854. The resin-film-coated release paper 852 includes a matrix material 858 (e.g., a film of the matrix material 58) disposed on or carried by a release liner 860, which is used to pre-impregnate the interlayer-toughened reinforcing fabric 700. The interlayer-toughened reinforcing fabric 700 and the layers of resin-film-coated release paper 852 may pass through a nip between heated rollers 856 to infuse (e.g., pre-impregnate) the matrix material 858 within the interlayer-toughened reinforcing fabric 700 and consolidate the pre-impregnated interlayer-toughened reinforcing fabric 750. The pre-impregnated interlayer-toughened reinforcing fabric 750 may then be partially cured.

Figure 18:
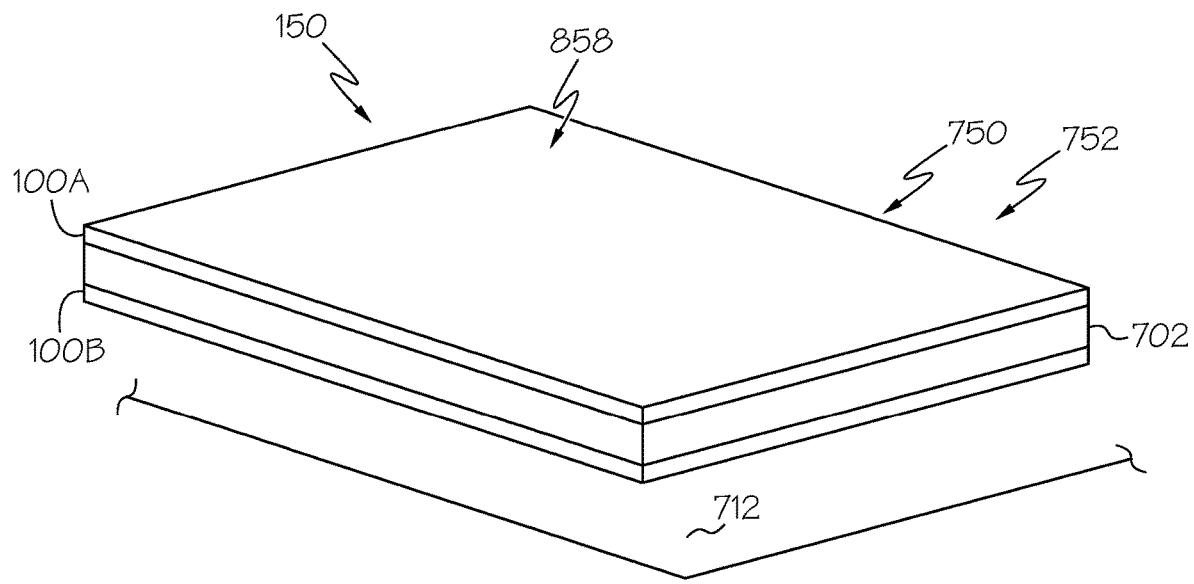
FIG. 18 is a schematic perspective view of another embodiment of the composite structure formed using the pre-impregnated interlayer-toughened reinforcing fabric of FIG. 17.

FIG. 18 is a schematic perspective view of another embodiment of the composite structure 150 formed using the pre-impregnated interlayer-toughened reinforcing fabric 750. The pre-impregnated interlayer-toughened reinforcing fabric 750 may be used as the preform 752 (e.g., a unidirectional prepreg). As an example, the preform 752 includes at least one reinforcing layer 702 disposed between two fiber-modified interlayers 100 (identified individually as a first fiber-modified interlayer 100A and a second fiber-modified interlayer 100B). In this example embodiment, the pre-impregnated interlayer-toughened reinforcing fabric 750 may be used as the preform 752 that is used to form the composite structure 150 (e.g., a composite laminate) having a desired configuration. As an example, one or more preforms 752 are disposed on the surface of the mold 712 in a desired configuration. The preform 752 may then be fully cured by placing the composite laminate under a vacuum-bag and curing the matrix material 714 at an elevated temperature and/or pressure to form the composite structure 150.

In another example embodiment, the preform 752 may include a plurality of layers, or stack, of the pre-impregnated interlayer-toughened reinforcing fabric 750. As an example, typically, each preform 752 has four or more layers of the pre-impregnated interlayer-toughened reinforcing fabric 750. In other words, layers of the pre-impregnated interlayer-toughened reinforcing fabric 750 may be stacked so that they form an alternating fiber-modified interlayer 100/reinforcing layer 702/fiber-modified interlayer 100/fiber-modified interlayer 100/reinforcing layer 702/fiber-modified interlayer 100, etc. arrangement. In an example of this embodiment, each layer of the pre-impregnated interlayer-toughened reinforcing fabric 750 may be oriented in the same direction (e.g., a unidirectional preform). In another example of this embodiment, one or more layers of the pre-impregnated interlayer-toughened reinforcing fabric 750 may be oriented in a different direction than at least one other layer of the of the pre-impregnated interlayer-toughened reinforcing fabric 750 (e.g., a multiaxial preform).

Figure 19:
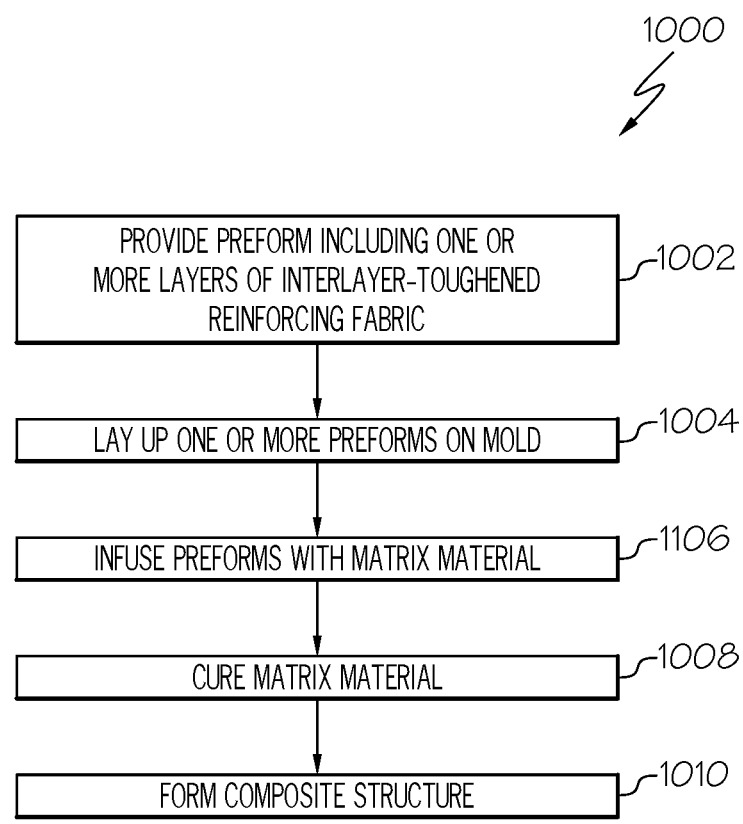
FIG. 19 is a flow diagram of an embodiment of the disclosed method for manufacturing the composite structure formed using the interlayer-toughened reinforcing fabric.

FIG. 19 is a flow diagram of an exemplary embodiment of the disclosed method 1000 for manufacturing the composite structure, for example, the composite structure 150 illustrated in FIGS. 6, 10, 14 and 18.

As shown at block 1002 (FIG. 19), at least one preform is provided. In an example embodiment, the preform may be a dry preform substantially similar to the preform 410 illustrated in FIG. 6 having the reinforcing layer 402 and the plurality of fiber-modified interlayers 100 arranged in an alternating configuration and stitched together to form the interlayer-toughened reinforcing fabric 400. In another example embodiment, the preform may be a dry preform substantially similar to the preform 454 illustrated in FIG. 10 having the plurality of reinforcing layers 402 and the plurality of fiber-modified interlayers 100 arranged in an alternating configuration and stitched together to form the interlayer-toughened reinforcing fabric 450. In another example embodiment, the preform may be a dry preform substantially similar to the preform 708 illustrated in FIG. 14 having at least one reinforcing layer 702 and one or more fiber-modified interlayers 100 arranged in an alternating configuration and melt-bonded together to form the interlayer-toughened reinforcing fabric 700. In yet another example embodiment, the preform may be a wet preform substantially similar to the preform 752 illustrated in FIG. 18 having at least one reinforcing layer 702 and one or more fiber-modified interlayers 100 arranged in an alternating configuration that is melt-bonded together and pre-impregnated with resin to form the pre-impregnated interlayer-toughened reinforcing fabric 750.

As shown at block 1004 (FIG. 19), one or more of the preforms are laid-up on the surface of a mold in a desired configuration. In an example embodiment, one or more layers of the interlayer-toughened reinforcing fabric 400 (e.g., the preform 410) (FIG. 6) may be laid-up on the surface of the mold in the final (e.g., three-dimensional) shape of the composite structure 150. In an example embodiment, one or more layers of the interlayer-toughened reinforcing fabric 450 (e.g., the preform 454) (FIG. 10) may be laid-up on the surface of the mold in the final (e.g., three-dimensional) shape of the composite structure 150. In another example embodiment, one or more layers of the interlayer-toughened reinforcing fabric 700 (e.g., the preform 708) (FIG. 14) may be laid-up on the surface of the mold in the final (e.g., three-dimensional) shape of the composite structure 150. In yet another example embodiment, one or more layers of the pre-impregnated interlayer-toughened reinforcing fabric 750 (e.g., the preform 752) (FIG. 18) may be laid-up on the surface of the mold in the final (e.g., three-dimensional) shape of the composite structure 150.

As shown at block 1006 (FIG. 19), the preform (e.g., preform 410, preform 454, preform 708 or preform 752) is infused with the matrix material. In an example embodiment, the one or more layers of the interlayer-toughened reinforcing fabric 400 (e.g., the preform 410) is infused with the matrix material 416 (FIG. 6) after being laid-up on the surface of the mold. In another example embodiment, the one or more layers of the interlayer-toughened reinforcing fabric 450 (e.g., the preform 454) is infused with the matrix material 458 (FIG. 10) after being laid-up on the surface of the mold. In another example embodiment, the one or more layers of the interlayer-toughened reinforcing fabric 700 (e.g., the preform 708) is infused with the matrix material 714 (FIG. 14) after being laid-up on the surface of the mold. In another example embodiment, the one or more layers of the pre-impregnated interlayer-toughened reinforcing fabric 750 (e.g., the preform 752) is infused with the matrix material 858 (FIG. 18) before being laid-up on the surface of the mold.

As shown at block 1008 (FIG. 19), the matrix material is cured and the composite structure 150 is formed, as shown at block 1010.

Figure 20:
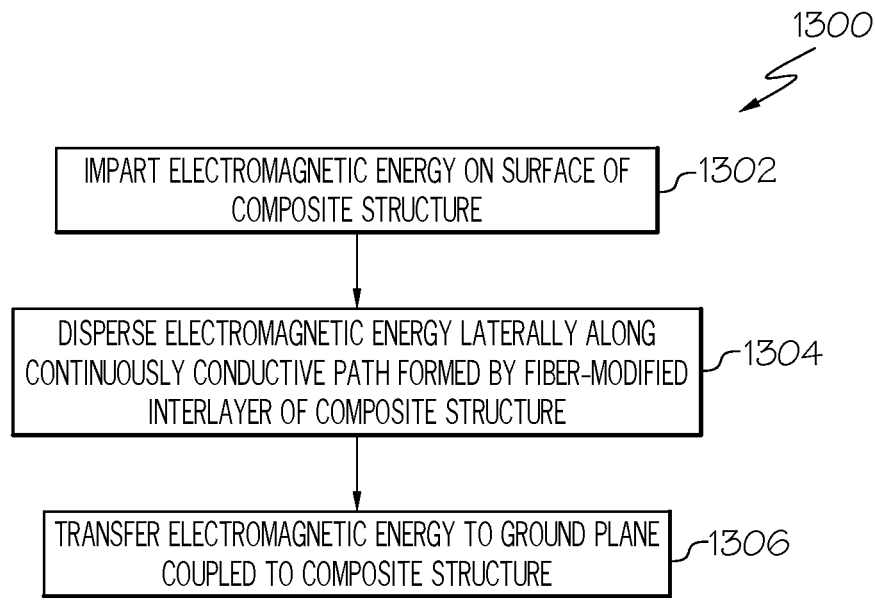
FIG. 20 is a flow diagram of an embodiment of the disclosed method for dissipating electromagnetic energy through the composite structure formed using the interlayer-toughened reinforcing fabric.
Figure 21:
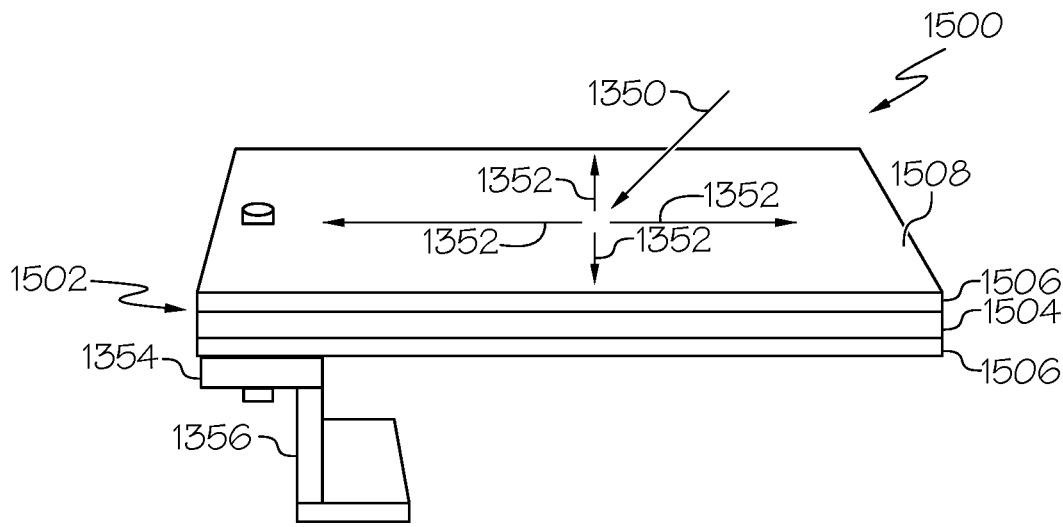
FIG. 21 is a schematic illustration of the dissipation of electromagnetic energy through the composite structure formed using the interlayer-toughened reinforcing fabric.

FIG. 20 is a flow diagram of an exemplary embodiment of the disclosed method 1300 for dissipating electromagnetic energy 1350 through a composite structure 1500. FIG. 21 is a schematic illustration of the dissipation of the electromagnetic energy 1350.

As shown at block 1302 (FIG. 20), the electromagnetic energy 1350 is imparted on a surface of the composite structure 1500. As an example, the electromagnetic energy 1350 may be the energy from a lightning strike.

In an example embodiment, the composite structure 1500 is an example of the composite structure 150 (FIGS. 6, 10, 14 and 18). The composite structure 1500 includes a reinforcing material 1502 and a matrix material 1508 infused into the reinforcing material 1502 and cured. As an example, the reinforcing material 1502 includes at least one layer of an interlayer-toughened reinforcing fabric. The reinforcing material 1502 is an example of the interlayer-toughened reinforcing fabric 400 (FIGS. 5 and 6), the interlayer-toughened reinforcing fabric 450 (FIGS. 9 and 10), the interlayer-toughened reinforcing fabric 700 (FIGS. 13 and 14) or the pre-impregnated interlayer-toughened reinforcing fabric 750 (FIGS. 17 and 18). The reinforcing material 1502 includes at least one reinforcing layer 1504 and at least one fiber-modified interlayer 1506 attached to the reinforcing layer 1504 arranged in an alternating configuration. The reinforcing layer 1504 is an example of the reinforcing layer 402 (FIGS. 5, 6, 9 and 10) or the reinforcing layer 702

(FIGS. 13, 14 and 18). The fiber-modified interlayer 1506 is an example of the fiber-modified interlayer 100 (FIGS. 5, 6, 9, 10, 13, 14 and 18). The matrix material 1508 is an example of the matrix material 416 (FIG. 6), the matrix material 458 (FIG. 10), the matrix material 714 (FIG. 14) or the matrix material 858 (FIG. 18).

As shown at block 1304 (FIG. 20), the electromagnetic energy 1350 (FIG. 21) is laterally dispersed along at least one continuously conductive path 1352 (FIG. 21). As an example, the continuously conductive path is formed by the fiber-modified interlayer 1506 (FIG. 21). As an example, the fiber-modified interlayer 1506 may be used to direct the electromagnetic energy 1350 (e.g., high current/voltage), for example, in the event of a lightning strike to the composite structure 1500.

As shown at block 1306 (FIG. 20), the electromagnetic energy 1350 (FIG. 21) is transferred to a ground plane 1354 (FIG. 21) coupled to the composite structure 1500. As an example, one or more of the fiber-modified interlayers 1506 of the composite structure 1500 serves to direct or steer the electromagnetic energy 1350 toward the ground plane 1354 and away from sensitive areas.

As an example, and as illustrated in FIG. 21, when electromagnetic energy 1350 is imparted on (e.g., when lightning hits) the surface of the composite structure 1500, current and/or voltage is directed by the fiber-modified interlayer 1506 forming, or adjacent to, the surface of the composite structure 1500 and flows along one or more conductive paths 1352 to the underlying ground plane 1354. As an example, the ground plane 1354 may be formed by an underlying support structure 1356 (e.g., an airframe of an aircraft) to which the composite structure 1500 (e.g., a composite skin panel) is connected and grounded. In situations where a portion of the electromagnetic energy 1350 flows through the thickness of the composite structure 1500, another one of the fiber-modified interlayers 1506 (e.g., defining an interior layer or forming, or adjacent to, an opposing surface of the composite structure 1500) directs the current and/or voltage to the underlying ground plane 1354.

Figures 22, 23:
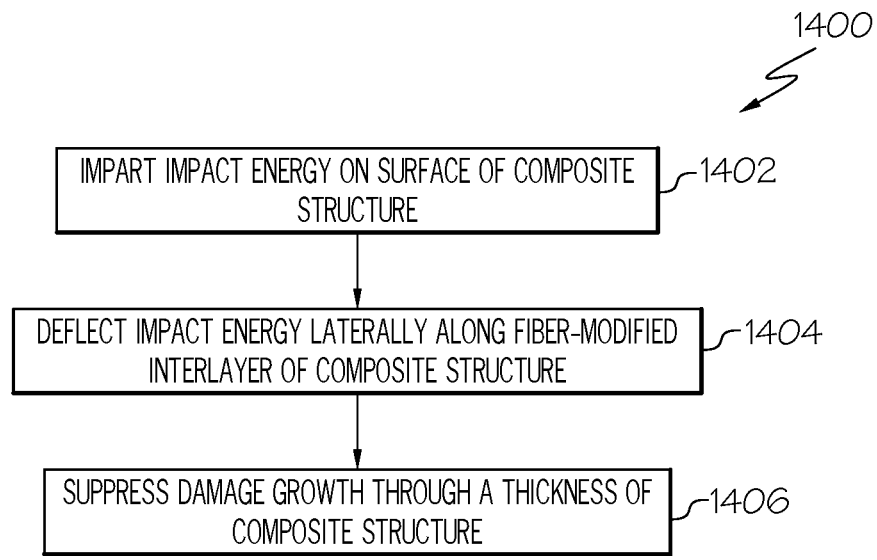
FIG. 22 is a flow diagram of an embodiment of the disclosed method for dissipating impact energy through the composite structure formed using the interlayer-toughened reinforcing fabric.
FIG. 23 is a schematic illustration of the dissipation of impact energy through the composite structure formed using the interlayer-toughened reinforcing fabric.
Figure 24:
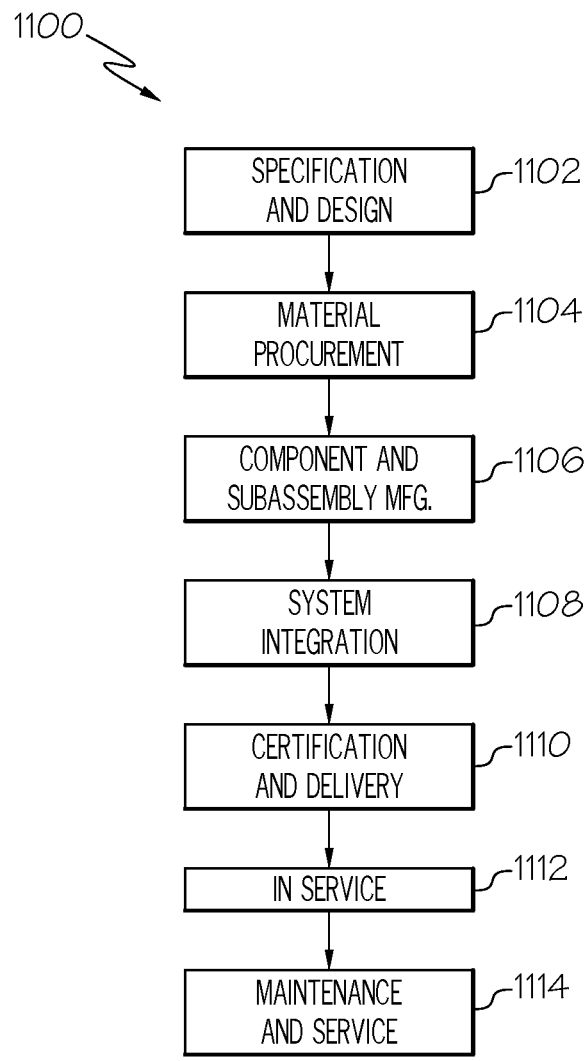
FIG. 24 is a schematic illustration of an aircraft.

FIG. 22 is a flow diagram of an exemplary embodiment of the disclosed method 1400 for dissipating impact energy 1450 through a composite structure 1500. FIG. 23 is a schematic illustration of the dissipation of the impact energy 1450.

As shown at block 1402 (FIG. 22), the impact energy 1450 is imparted on a surface of the composite structure 1500. As an example, the impact energy 1450 may be the energy resulting from an object impacting the composite structure 1500.

In an example embodiment, the composite structure 1500 is an example of the composite structure 150 (FIGS. 6, 10, 14 and 18). The composite structure 1500 includes a reinforcing material 1502 and a matrix material 1508 infused into the reinforcing material 1502 and cured. As an example, the reinforcing material 1502 includes at least one layer of an interlayer-toughened reinforcing fabric. The reinforcing material 1502 is an example of the interlayer-toughened reinforcing fabric 400 (FIGS. 5 and 6), the interlayer-toughened reinforcing fabric 450 (FIGS. 9 and 10), the interlayer-toughened reinforcing fabric 700 (FIGS. 13 and 14) or the pre-impregnated interlayer-toughened reinforcing fabric 750 (FIGS. 17 and 18). The reinforcing material 1502 includes at least one reinforcing layer 1504 and at least one fiber-modified interlayer 1506 attached to the reinforcing layer 1504 arranged in an alternating configuration. The reinforcing layer 1504 is an example of the reinforcing layer 402 (FIGS. 5, 6, 9 and 10) or the reinforcing layer 702 (FIGS. 13, 14 and 18). The fiber-modified interlayer 1506 is an example of the fiber-modified interlayer 100 (FIGS. 5, 6, 9, 10, 13, 14 and 18). The matrix material 1508 is an example of the matrix material 416 (FIG. 6), the matrix material 458 (FIG. 10), the matrix material 714 (FIG. 14) or the matrix material 858 (FIG. 18).

As shown at block 1404 (FIG. 22), the impact energy 1450 (FIG. 23) is laterally deflected along the composite structure (FIG. 23). As an example, the impact energy 1450 is deflected laterally along the least one fiber-modified interlayer 1506. As an example, the fiber-modified interlayer 1506 may be used to toughen the composite structure 1500 and suppress the growth of cracks through the composite structure 1500, for example, in the event of an impact to the composite structure 1500.

As shown at block 1406 (FIG. 22), damage growth through the thickness of the composite structure 1500 resulting from the impact energy 1450 (FIG. 23) is suppressed. As an example, damage growth through the thickness of the composite structure 1500 resulting from the impact energy 1450 is suppressed by one or more of the fiber-modified interlayers 1506 of the composite structure 1500.

As an example, and as illustrated in FIG. 23, damage growth is suppressed by preventing cracks from propagating through the thickness of the composite structure, for example, from one ply of the composite laminate to the next, by deflecting the cracks along the fiber-modified interlayer 1506. As such, the fiber-modified interlayer 1506 acts as a local crack deflector in the interlayer between plies of the reinforcing layers 1504.

Figure 25:
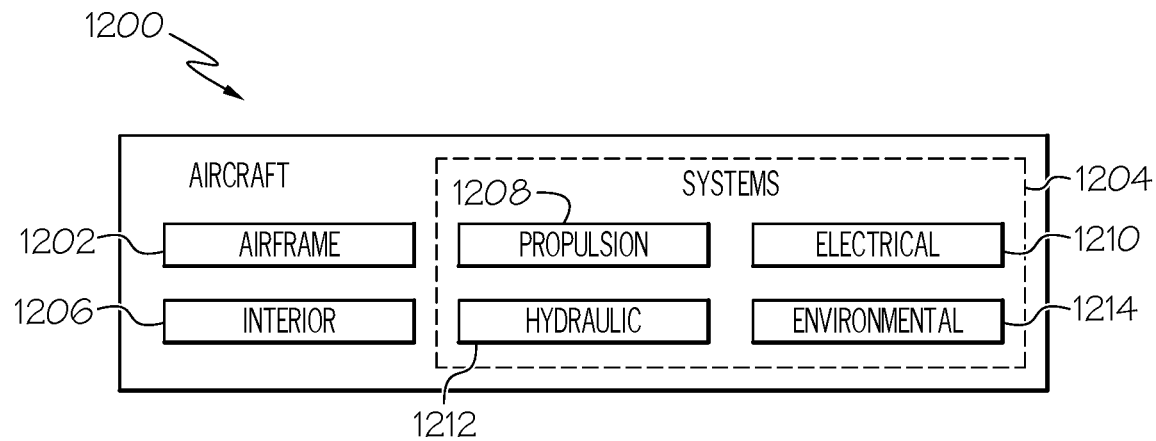
FIG. 25 is a schematic block diagram of aircraft production and service methodology.

Examples of the disclosed fiber-modified interlayer 100, the interlayer-toughened reinforcing fabric 400, 700 made using the fiber-modified interlayer 100, the composite structure made 150 using the interlayer-toughened reinforcing fabric 400, 700 and the methods for making the same disclosed herein may be described in the context of an aircraft manufacturing and service method 1100 as shown in FIG. 25 and an aircraft 1200 as shown in FIG. 25.

During pre-production, the illustrative method 1100 may include specification and design, as shown at block 1102, of aircraft 1200 and material procurement, as shown at block 1104. During production, component and subassembly manufacturing, as shown at block 1106, and system integration, as shown at block 1108, of the aircraft 1200 may take place. Production of fiber-modified interlayer 100 and use of the fiber-modified interlayer 100 to fabricate the interlayer-toughened reinforcing fabric 400, 450, 700 or the pre-impregnated interlayer-toughened reinforcing fabric 750 and, subsequently, the composite structure 150, as described herein, may be accomplished as a portion of the production, component and subassembly manufacturing step (block 1106) and/or as a portion of the system integration (block 1108). Thereafter, the aircraft 1200 may go through certification and delivery, as shown block 1110, to be placed in service, as shown at block 1112. While in service, the aircraft 1200 may be scheduled for routine maintenance and service, as shown at block 1114. Routine maintenance and service may include modification, reconfiguration, refurbishment, etc. of one or more systems of the aircraft 1200.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 25, the aircraft 1200 produced by the illustrative method 1100 may include an airframe 1202, for example, having composite panels or other composite structure 150 made from interlayer-toughened reinforcing fabric 400, 450, 700 or the pre-impregnated interlayer-toughened reinforcing fabric 750 fabricated using the fiber-modified interlayer 100, a plurality of high-level systems 1204 and an interior 1206. Examples of the high-level systems 1204 include one or more of a propulsion system 1208, an electrical system 1210, a hydraulic system 1212 and an environmental system 1214. Any number of other systems may be included. Although an aerospace example is shown, the principles disclosed herein may be applied to other industries, such as the automotive industry, the marine industry, and the like.

The systems, apparatus and methods shown or described herein may be employed during any one or more of the stages of the manufacturing and service method 1100. For example, components or subassemblies corresponding to component and subassembly manufacturing (block 1106) may be fabricated or manufactured in a manner similar to components or subassemblies produced while the aircraft 1200 is in service (block 1112). Also, one or more examples of the systems, apparatus, and methods, or combination thereof may be utilized during production stages (blocks 1108 and 1110). Similarly, one or more examples of the systems, apparatus, and methods, or a combination thereof, may be utilized, for example and without limitation, while the aircraft 1200 is in service (block 1112) and during maintenance and service stage (block 1114).

Reference herein to "embodiment" means that one or more feature, structure, element, component or characteristic described in connection with the embodiment is included in at least one implementation of the disclosed invention. Thus, the phrase "one embodiment," "another embodiment," and similar language throughout the present disclosure may, but do not necessarily, refer to the same embodiment. Further, the subject matter characterizing any one embodiment may, but does not necessarily, include the subject matter characterizing any other embodiment.

Similarly, reference herein to "example" means that one or more feature, structure, element, component or characteristic described in connection with the example is included in at least one embodiment. Thus, the phrases "one example," "another example," and similar language throughout the present disclosure may, but do not necessarily, refer to the same example. Further, the subject matter characterizing any one example may, but does not necessarily, include the subject matter characterizing any other example.

Unless otherwise indicated, the terms "first," "second," etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example and without limitation, two of item A, one of item B, and ten of item C; four of item B and seven of item C; or some other suitable combination.

As used herein, the terms "approximately" and "about" represent an amount close to the stated amount that still performs the desired function or achieves the desired result. For example, the terms "approximately" and "about" may refer to an amount that is within less than 10% of, within less than 5% of, within less than 1% of, within less than 0.1% of, and within less than 0.01% of the stated amount.

As used herein, the term "substantially" may include exactly and similar, which is to an extent that it may be perceived as being exact. For illustration purposes only and not as a limiting example, the term "substantially" may be quantified as a variance of +/−5% from the exact or actual. For example, the phrase "A is substantially the same as B" may encompass embodiments where A is exactly the same as B, or where A may be within a variance of +/−5%, for example of a value, of B, or vice versa.

As used herein, the terms "partially" or "at least a portion of" may represent an amount of a whole that includes an amount of the whole that may include the whole. For example, the term "a portion of" may refer to an amount that is greater than 0.01% of, greater than 0.1% of, greater than 1% of, greater than 10% of, greater than 20% of, greater than 30% of, greater than 40% of, greater than 50% of, greater than 60%, greater than 70% of, greater than 80% of, greater than 90% of, greater than 95% of, greater than 99% of, and 100% of the whole.

In FIG. 25, referred to above, solid lines, if any, connecting various elements and/or components represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines are either selectively provided or relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIG. 25 may be combined in various ways without the need to include other features described in FIG. 25, other drawing figures, and/or the accompanying disclosure, even though such combination or combinations are not explicitly illustrated herein. Similarly, additional features not limited to the examples presented, may be combined with some or all of the features shown and described herein.

In FIGS. 4, 8, 12, 16, 19, 20 and 22 referred to above, the blocks may represent operations and/or portions thereof and lines connecting the various blocks do not imply any particular order or dependency of the operations or portions thereof. Blocks, if any, represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 4, 8, 12, 16, 19, 20 and 22 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Although various embodiments of the disclosed apparatus, systems and methods have been shown and described, modifications may occur to those skilled in the art upon reading the specification. The present application includes such modifications and is limited only by the scope of the claims.

What is claimed is:

1. A composite manufacturing method comprising:
   advancing only a nonwoven fabric, formed of continuous fibers, into a volume of a slurry, formed of discontinuous fibers suspended in a dispersive liquid;
   submerging only said nonwoven fabric in said slurry such that a first surface and a second surface, opposite said first surface, of said nonwoven fabric are completely covered by said slurry;
   while submerging in said slurry, drawing only said nonwoven fabric through said slurry;
   while submerging and drawing, filtering said discontinuous fibers through only said nonwoven fabric;
   while submerging, drawing, and filtering, in a single pass through said slurry, yielding a fiber-modified interlayer comprising a first network of said discontinuous fibers attached to said first surface of said nonwoven fabric and a second network of said discontinuous fibers attached to said second surface, opposite said first network of said discontinuous fibers; and
   withdrawing said fiber-modified interlayer from said slurry.

2. The method of claim 1 further comprising containing said slurry within a storage tank, wherein said drawing comprises moving said nonwoven fabric though said slurry while said slurry is contained in said storage tank and said filtering comprises passing said slurry through said nonwoven fabric while moving said nonwoven fabric through said slurry.

3. The method of claim 1 wherein said drawing comprises drawing said nonwoven fabric from a supply roll using a plurality of guide rollers.

4. The method of claim 1 wherein said continuous fibers comprise a thermoplastic material.

5. The method of claim 1 wherein said discontinuous fibers comprise a carbonaceous material.

6. The method of claim 1 further comprising dispersing said discontinuous fibers in said dispersive liquid to yield said slurry.

7. The method of claim 1 wherein said discontinuous fibers comprise a member selected from the group consisting of carbon nanotubes, graphene platelets, carbon whiskers, chopped carbon fibers, milled carbon fibers and carbon nanofibers.

8. The method of claim 1 wherein said dispersive liquid comprises water.

9. The method of claim 1 further comprising:
   mechanically bonding a first portion of said discontinuous fibers to at least a portion of said continuous fibers forming said first surface of said nonwoven fabric in response to drawing and filtering; and
   mechanically bonding a second portion of said discontinuous fibers to at least a portion of said continuous fibers forming said second surface of said nonwoven fabric in response to drawing and filtering.

10. The method of claim 1 further comprising passing said fiber-modified interlayer, comprising said nonwoven fabric having said first network and said second network of said discontinuous fibers attached thereto, through a pair of pressure rollers.

11. The method of claim 1 further comprising heating said fiber-modified interlayer, comprising said nonwoven fabric having said first network and said second network of said discontinuous fibers attached thereto.

12. The method of claim 1 wherein at least a portion of said discontinuous fibers of said first network and said second network are interspersed through a thickness of said nonwoven fabric.

13. The method of claim 1 further comprising attaching a reinforcing layer to said fiber-modified interlayer to yield an interlayer-toughened reinforcing fabric.

14. The method of claim 13 wherein said attaching comprises melt-bonding said reinforcing layer to said fiber-modified interlayer.

15. The method of claim 13 further comprising impregnating said interlayer-toughened reinforcing fabric with a matrix material.

16. The method of claim 15 further comprising curing the matrix material.

17. The method of claim 1 further comprising attaching, in an alternating configuration, a plurality of reinforcing layers to a plurality of said fiber-modified interlayers to yield an interlayer-toughened reinforcing fabric.

18. The method of claim 17 wherein said attaching comprises stitching together said plurality of reinforcing layers and said plurality of said fiber-modified interlayers with a thread.

19. The method of claim 1 further comprising:
   forming said first network of said discontinuous fibers attached to said first surface of said nonwoven fabric to have a first thickness; and
   forming said second network of said discontinuous fibers attached to said second surface of said nonwoven fabric to have a second thickness,
   wherein the first thickness and the second thickness are substantially the same and uniform.

20. The method of claim 1 further comprising:
   consolidating said fiber-modified interlayer, comprising said nonwoven fabric having said first network and said second network of said discontinuous fibers attached thereto, through a pair of pressure rollers; and
   integrating said discontinuous fibers within said continuous fibers.

* * * * *